(12) United States Patent
Zhang

(10) Patent No.: US 11,375,389 B2
(45) Date of Patent: Jun. 28, 2022

(54) METHOD AND DEVICE OF CHANNEL ACCESS FOR WIRELESS COMMUNICATION ON UNLICENSED SPECTRUM IN UE AND BASE STATION

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 117 days.

(21) Appl. No.: 16/917,940

(22) Filed: Jul. 1, 2020

(65) Prior Publication Data

US 2020/0336927 A1 Oct. 22, 2020

Related U.S. Application Data

(63) Continuation of application No. PCT/CN2018/071585, filed on Jan. 5, 2018.

(51) Int. Cl.
*H04L 12/28* (2006.01)
*H04W 24/08* (2009.01)
*H04W 16/14* (2009.01)
*H04W 72/04* (2009.01)
*H04J 1/16* (2006.01)
*H04L 5/00* (2006.01)

(52) U.S. Cl.
CPC ........... *H04W 24/08* (2013.01); *H04W 16/14* (2013.01); *H04W 72/0446* (2013.01); *H04W 72/0453* (2013.01); *H04L 5/001* (2013.01)

(58) Field of Classification Search
CPC ..... H04L 5/0007; H04L 5/0055; H04L 5/001; H04W 16/14; H04W 72/0446; H04W 72/0453; H04W 74/0808; H04W 74/0816
USPC ................................ 370/252, 329, 430, 442
See application file for complete search history.

(56) References Cited

U.S. PATENT DOCUMENTS

2017/0303313 A1 10/2017 Cariou et al.
2018/0132137 A1* 5/2018 Dai ............................ H04L 1/08
2018/0343646 A1* 11/2018 Chou .................... H04W 16/14
(Continued)

FOREIGN PATENT DOCUMENTS

CN 105474569 A 4/2016
CN 106658751 A 5/2017
(Continued)

OTHER PUBLICATIONS

SR received in application No. PCT/CN2018/071585 dated Apr. 19, 2018.

*Primary Examiner* — John Pezzlo

(57) ABSTRACT

The present disclosure provides a method and a device for wireless communications in a UE and base station. A first node receives T first-type radio signals and transmits T second-type radio signals in a first time window; and then performs Q energy detection(s) respectively in Q time sub-pool(s) on a first sub-band to obtain Q detection value(s); the T second-type radio signals respectively correspond to the T first-type radio signals; at least one multi-carrier symbol is occupied by each of the T second-type radio signals; among the T first-type radio signals there is(are) only T1 first-type radio signal(s) being used to determine Q; the first node is a base station, or the first node is a UE.

20 Claims, 19 Drawing Sheets

(56) References Cited

U.S. PATENT DOCUMENTS

| | | | |
|---|---|---|---|
| 2019/0075581 A1* | 3/2019 | Salem | H04W 74/006 |
| 2019/0289513 A1* | 9/2019 | Jeon | H04W 72/0453 |
| 2020/0037359 A1* | 1/2020 | Wang | H04L 1/1896 |

FOREIGN PATENT DOCUMENTS

| | | |
|---|---|---|
| CN | 107211451 A | 9/2017 |
| EP | 3139671 A | 3/2017 |

\* cited by examiner $$\text{First ratio} = \frac{\text{Number of NACK(s)}}{Y}$$

$$\text{First ratio} = \frac{\text{Number of NACK(s)}}{Y1}$$

$$\text{First ratio} = \frac{\text{Number of NACK(s)}}{X}$$

0  #1           #Z-2  #Z-1

Z sub-signals | comprising new data | not comprising new data | ... | not comprising new data | comprising new data |

First value= the number of sub-signal(s) comprising new data among Z sub-signals

Z sub-signals | comprising new data | not comprising new data | ... | not comprising new data | comprising new data |

$$\text{First value} = \frac{\text{The number of sub-signal(s) comprising new data among Z sub-signals}}{Z}$$

Z1 sub-signals | comprising new data | not comprising new data | ... | not comprising new data | comprising new data |

First value = the number of sub-signal(s) comprising new data among Z1 sub-signal(s)

FIG. 12C

Z1 sub-signals

| | #0 | #1 | ... | #Z1-2 | #Z1-1 |
|---|---|---|---|---|---|
| | comprising new data | not comprising new data | ... | not comprising new data | comprising new data |

$$\text{First value} = \frac{\text{The number of sub-signal(s) comprising new data among } Z1 \text{ sub-signal(s)}}{Z1}$$

FIG. 12D

X second statistical values

| | #0 | #1 | ... | #X-2 | #X-1 |
|---|---|---|---|---|---|
| | comprising new data | not comprising new data | ... | not comprising new data | comprising new data |

First value = the number of second statistical value(s) comprising new data among X second statistical values

FIG. 12E

X second statistical values

| | #0 | #1 | ... | #X-2 | #X-1 |
|---|---|---|---|---|---|
| | comprising new data | not comprising new data | ... | not comprising new data | comprising new data |

$$\text{First value} = \frac{\text{The number of second statistical value(s) comprising new data among } X \text{ second statistical values}}{X}$$

FIG. 12F

|  | #0 | #1 | ... | #w3-2 | #w3-1 |
|---|---|---|---|---|---|
| w3 Sub-signals | comprising new data | not comprising new data | ... | not comprising new data | comprising new data |

|  | #0 | #1 | ... | #t4-2 | #t4-1 |
|---|---|---|---|---|---|
| t4 second statistical values | comprising new data | not comprising new data | ... | not comprising new data | comprising new data |

First value = The number of sub-signal(s) comprising new data among w3 sub-signals + the number of second statistical value(s) comprising new data among t4 second statistical values

FIG. 12G

|  | #0 | #1 | ... | #w3-2 | #w3-1 |
|---|---|---|---|---|---|
| w3 sub-signals | comprising new data | not comprising new data | ... | not comprising new data | comprising new data |

|  | #0 | #1 | ... | #t4-2 | #t4-1 |
|---|---|---|---|---|---|
| t4 second statistical values | comprising new data | not comprising new data | ... | not comprising new data | comprising new data |

Third reference value = The number of sub-signal(s) comprising new data among w3 sub-signals + the number of second statistical value(s) comprising new data among t4 second statistical values Fourth reference value = w3+t4

$$\text{First value} = \frac{\text{Third reference value}}{\text{Fourth reference value}}$$

FIG. 12H

First integer set    {15, 31, 63}
                          |   |
                         K0  K1

$$K = \begin{cases} K1, & \text{given ratio} \geq \text{first target value} \\ 15, & \text{given ratio} < \text{first target value} \end{cases}$$

FIG. 14

First integer set     {15, 31, 63}
                           |
                         K0=K1

$$K = \begin{cases} K0, & \text{given value} \leq \text{second target value} \\ 15, & \text{given value} > \text{second target value} \end{cases}$$

FIG. 15

METHOD AND DEVICE OF CHANNEL ACCESS FOR WIRELESS COMMUNICATION ON UNLICENSED SPECTRUM IN UE AND BASE STATION

CROSS REFERENCE TO RELATED APPLICATIONS

This application is a continuation of International Application No. PCT/CN2018/071585, filed Jan. 5, 2018, claims the priority benefit of International Patent Application No. PCT/CN2018/071585, filed on Jan. 5, 2018, the full disclosure of which is incorporated herein by reference.

BACKGROUND

Technical Field

The present disclosure relates to transmission methods and devices in wireless communication systems, and in particular to a communication scheme and device that support data transmission on Unlicensed Spectrum.

Related Art

In a traditional 3rd Generation Partner Project (3GPP) Long-term Evolution (LTE) system, data transmission only occurs on Licensed Spectrum. However, as traffic flow began to skyrocket, particularly in some urban areas, the Licensed Spectrum may hardly meet growing demands for traffic, therefore, in Release 13 and Release 14 communications on Unlicensed Spectrum is introduced into a cellular system and used for downlink and uplink data transmissions. To ensure compatibility with other access technologies on Unlicensed Spectrum, the technique of Listen Before Talk (LBT) is adopted by Licensed Assisted Access (LAA) so as to prevent interference caused by multiple transmitters occupying a same frequency resource at the same time. A transmitter in LTE system adopts quasi-omnidirectional antennas in performing LBT.

In the process of Cat 4 LBT (refer to 3GPP TR36.889) in LTE, a transmitter (that is, a base station or a User Equipment) is supposed to perform backoff after a defer duration, and the time length of the backoff is calculated based on slot durations in a Clear Channel Assessment (CCA). A number of the slot durations within the backoff is randomly selected by the transmitter within a Contention Window Size (CWS). For downlink transmission, a CWS is adjusted according to a Hybrid Automatic Repeat reQuest (HARQ) feedback corresponding to data comprised in a reference sub-frame previously transmitted on the Unlicensed Spectrum. For uplink, a CWS is adjusted according to whether new data is comprised in data in a reference sub-frame previously transmitted on the Unlicensed Spectrum.

At present, technical discussions about 5G New Radio (NR) are in progress, which include Massive Multi-Input-Multi-Output (MIMO), a new hot topic of study on next generation mobile communications. In Massive MIMO, a plurality of antennas form through beamforming a beam pointing in a specific spatial direction to improve communication quality. When considering characteristics of coverage brought about by beamforming, a traditional LAA technology needs to be reconsidered, such as an LBT scheme.

SUMMARY

Inventors find through researches that beamforming will be widely applied in NR systems, so how to reduce co-channel interferences between multiple transmitters so as to improve system capacity becomes a key issue that needs to be solved.

To address the above problem, the present disclosure proposes a solution. It should be noted that the embodiments of the present disclosure and the characteristics in the embodiments may be mutually combined if no conflict is incurred.

The present disclosure provides a method in a first node for wireless communications, comprising:

receiving T first-type radio signals, and transmitting T second-type radio signals in a first time window;

performing Q energy detection(s) respectively in Q time sub-pool(s) on a first sub-band to obtain Q detection value(s);

herein, the T second-type radio signals respectively correspond to the T first-type radio signals; at least one multi-carrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station, or the first node is a UE.

In one embodiment, the problem in need of solving in the present disclosure is that: in NR system, due to the application of massive MIMO, the situations of interference in different beam directions may vary a lot. Therefore, the impact of beam directions needs to be considered when determining a CWS. When a transmitting node employs a specific beam for LBT, the CWS has to accurately reflect interferences in the specific beam direction, which requires updating the method of CWS adjustment. The aforementioned scheme seeks to solve the problem by optional counting of data in a reference sub-frame, thereby reducing the chance of multiple transmitters occupying a same frequency resource and co-channel interferences that arise therefrom.

In one embodiment, the essence of the above method lies in that the first time window represents a reference sub-frame, wherein the detailed definition of the reference sub-frame can be found in 3GPP TS36.213, section 15. The first node is allowed to select part of data comprised in a reference sub-frame for CWS adjustment, considering multi-antenna related configurations of data, such as a transmission antenna port group and a transmitting beam. An advantage of the above method is that the CWS can reflect the situation of interference in a beam direction in which the Q energy detection(s) points(point) with higher precision, thereby configuring a premium backoff Contention Window for the Q energy detection(s).

According to one aspect of the present disclosure, the above method is characterized in that the first node is a base station, and the T first-type radio signals respectively indicate whether the T second-type radio signals are correctly received.

According to one aspect of the present disclosure, the above method is characterized in that the T1 second-type radio signal(s) comprises(comprise) W sub-signal(s), and the T1 first-type radio signal(s) indicates(indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

In one embodiment, the above method is advantageous in that a transmitting beam's direction of at least one sub-signal of any of the T1 second-type radio signal(s) is covered by a receiving beam's direction corresponding to the Q energy detection(s), therefore, the T1 first-type radio signal(s) can provide a clear picture of interferences in a beam direction in which the Q energy detection(s) points(point), thus configuring an optimal contention window for the Q energy detection(s).

According to one aspect of the present disclosure, the above method is characterized in that the first node is a UE, and the T first-type radio signals respectively comprise scheduling information of the T second-type radio signals.

According to one aspect of the present disclosure, the above method is characterized in that the T1 second-type radio signal(s) comprises(comprise) V sub-signal(s), and the T1 first-type radio signal(s) indicates(indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

According to one aspect of the present disclosure, the above method is characterized in that the T1 first-type radio signal(s) is(are) used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

According to one aspect of the present disclosure, the above method is characterized in further comprising:

receiving S third-type radio signal(s), and transmitting S fourth-type radio signal(s) in a second time window;

herein, the S fourth-type radio signal(s) respectively corresponds(correspond) to the S third-type radio signal(s); the S third-type radio signal(s) and the T1 first-type radio signal(s) are jointly used to determine the Q, and S is a positive integer; each of the S fourth-type radio signal(s) is spatially associated with the Q energy detection(s).

In one embodiment, the essence of the above method lies in that the second time window comprises one or more reference sub-frames, and the detailed definition of the reference sub-frame can be found in 3GPP TS36.213, section 15. The first node selects part of data in multiple reference sub-frames comprised by the first time window and the second time window for CWS adjustment, and considers multi-antenna related configurations of data in selection, such as a transmission antenna port group and a transmitting beam. An advantage of the above method is that the CWS can reflect interferences in the beam direction in which the Q energy detection(s) points(point) more accurately, thus configuring a best backoff contention window for the Q energy detection(s).

According to one aspect of the present disclosure, the above method is characterized in further comprising:

transmitting a fifth radio signal;

herein, a start time for time-domain resources occupied by the fifth radio signal is no earlier than an end time for the Q time sub-pool(s).

According to one aspect of the present disclosure, the above method is characterized in further comprising:

operating first information;

herein, the first information comprises scheduling information of the fifth radio signal; the operating is receiving, and the first node is a UE; or the operating is transmitting, and the first node is a base station.

The present disclosure provides a device in a first node for wireless communications, comprising:

a first processor, receiving T first-type radio signals, and transmitting T second-type radio signals in a first time window; and a first receiver, performing Q energy detection(s) respectively in Q time sub-pool(s) on a first sub-band to obtain Q detection value(s);

herein, the T second-type radio signals respectively correspond to the T first-type radio signals; at least one multi-carrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station, or the first node is a UE.

In one embodiment, the above device in the first node is characterized in that the first node is a base station, and the T first-type radio signals respectively indicate whether the T second-type radio signals are correctly received.

In one embodiment, the above device in the first node is characterized in that the T1 second-type radio signal(s) comprises(comprise) W sub-signal(s), and the T1 first-type radio signal(s) indicates(indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

In one embodiment, the above device in the first node is characterized in that the first node is a UE, and the T first-type radio signals respectively comprise scheduling information of the T second-type radio signals.

In one embodiment, the above device in the first node is characterized in that the T1 second-type radio signal(s) comprises(comprise) V sub-signal(s), and the T1 first-type radio signal(s) indicates(indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

In one embodiment, the above device in the first node is characterized in that the T1 first-type radio signal(s) is(are) used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

In one embodiment, the above device in the first node is characterized in that the first processor also receives S third-type radio signal(s), and transmits S fourth-type radio signal(s) in a second time window; wherein the S fourth-type radio signal(s) respectively corresponds(correspond) to the S third-type radio signal(s); the S third-type radio signal(s) and the T1 first-type radio signal(s) are jointly used to determine the Q, and S is a positive integer; each of the S fourth-type radio signal(s) is spatially associated with the Q energy detection(s).

In one embodiment, the above device in the first node is characterized in further comprising:

a first transmitter, transmitting a fifth radio signal;

herein, a start time for time-domain resources occupied by the fifth radio signal is no earlier than an end time for the Q time sub-pool(s).

In one embodiment, the above device in the first node is characterized in that the first processor also operates first information; wherein the first information comprises scheduling information of the fifth radio signal; the operating is receiving, and the first node is a UE; or the operating is transmitting, and the first node is a base station.

In one embodiment, the present disclosure is advantageous over conventional schemes in the following aspects:

For each LBT, a transmitting node considers a beam direction in which the LBT points when choosing a CWS and selects data, of which transmitting beams are covered by a receiving beam of the LBT, from a reference sub-frame for CWS adjustment. The method ensures that interference information in the data selected can precisely reflect the situation of interference in the LBT's beam direction, thereby configuring a best CWS for the LBT.

For each LBT, a transmitting node considers a beam direction in which the LBT points when choosing a CWS and selects data, of which transmitting beams are covered by a receiving beam of the LBT, from each reference sub-frame of multiple reference sub-frames for CWS adjustment. The method ensures that interference information in the data selected can precisely reflect the situation of interference in the LBT's beam direction, thereby configuring a best CWS for the LBT.

BRIEF DESCRIPTION OF THE DRAWINGS

Other features, objects and advantages of the present disclosure will become more apparent from the detailed description of non-restrictive embodiments taken in conjunction with the following drawings:

FIG. 12A-FIG. 12H respectively illustrate a schematic diagram of relations of X given first radio signals, X given second radio signals and Q according to another embodiment of the present disclosure.

FIG. 14 illustrates a schematic diagram of X given first radio signals being used to determine K candidate integers according to one embodiment of the present disclosure.

FIG. 15 illustrates a schematic diagram of X given first radio signals being used to determine K candidate integers according to another embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
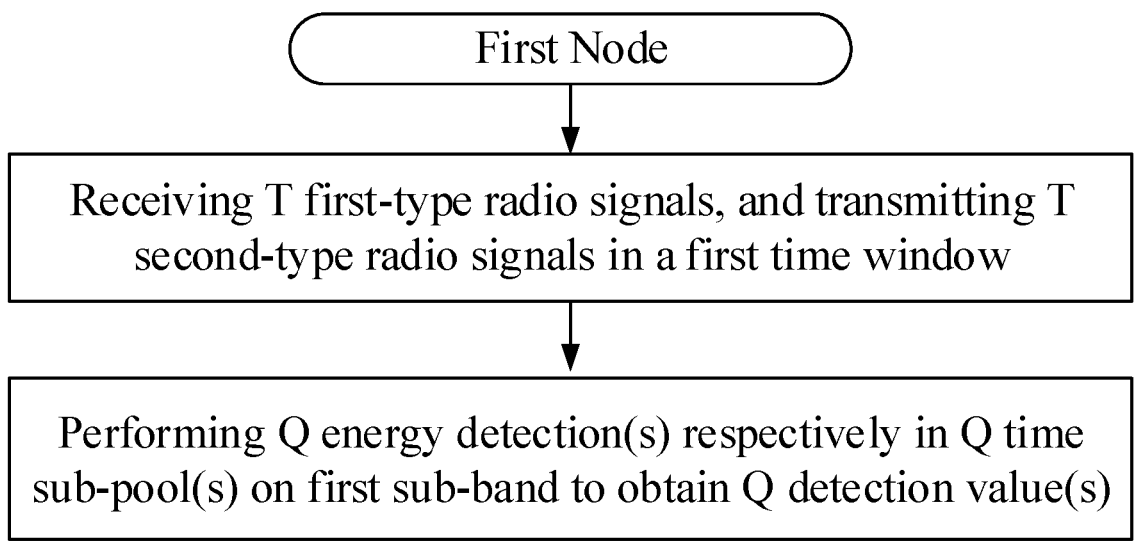
FIG. 1 illustrates a flowchart of T first-type radio signals, T second-type radio signals and Q energy detection(s) according to one embodiment of the present disclosure.

Embodiment 1 illustrates a flowchart of T first-type radio signals, T second-type radio signals and Q energy detection(s), as shown in FIG. 1.

In Embodiment 1, the first node of the present disclosure receives T first-type radio signals, and transmits T second-type radio signals in a first time window; and performs Q energy detection(s) respectively in Q time sub-pool(s) on a first sub-band to obtain Q detection value(s). Herein, the T second-type radio signals respectively correspond to the T first-type radio signals; at least one multicarrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station, or the first node is a UE.

In one embodiment, any of the T first-type radio signals comprises control information.

In one embodiment, the T first-type radio signals are transmitted on the first sub-band.

In one embodiment, the T first-type radio signals are transmitted on a frequency band other than the first sub-band.

In one embodiment, the T first-type radio signals are transmitted on a frequency band deployed on Licensed Spectrum other than the first sub-band.

In one embodiment, the T first-type radio signals are transmitted on a frequency band deployed on Unlicensed Spectrum other than the first sub-band.

In one embodiment, the T first-type radio signals are transmitted on a frequency band deployed on Licensed Spectrum.

In one embodiment, any of the T second-type radio signals comprises data.

In one embodiment, any of the T second-type radio signals comprises a reference signal.

In one embodiment, any of the T second-type radio signals comprises data and a reference signal.

In one embodiment, the T second-type radio signals are composed by data and reference signals.

In one embodiment, the T second-type radio signals comprise data.

In one embodiment, the T second-type radio signals comprise reference signals.

In one embodiment, the T second-type radio signals are transmitted on the first sub-band.

In one embodiment, frequency-domain resources occupied by the T second-type radio signals belong to the first sub-band.

In one embodiment, frequency-domain resources occupied by the T second-type radio signals comprise the first sub-band.

In one embodiment, time-domain resources occupied by the T second-type radio signals are the same.

In one embodiment, multicarrier symbols occupied by the T second-type radio signals are the same.

In one embodiment, frequency-domain resources occupied by the T second-type radio signals are mutually orthogonal (i.e., non-overlapping).

In one embodiment, there is at least one subcarrier occupied by all of the T second-type radio signals.

In one embodiment, frequency-domain resources occupied by the T second-type radio signals are the same.

In one embodiment, frequency-domain resources occupied by at least two of the T second-type radio signals are the same.

In one embodiment, frequency-domain resources occupied by at least two of the T second-type radio signals are mutually orthogonal (i.e., non-overlapping).

In one embodiment, the first time window is a sub-frame.

In one embodiment, the first time window is a slot.

In one embodiment, the first time window comprises a positive integer number of multicarrier symbol(s).

In one embodiment, the first time window comprises a positive integer number of contiguous multicarrier symbols.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, the multicarrier symbol is a Filter Bank Multi Carrier (FBMC) symbol.

In one embodiment, the multicarrier symbol comprises Cyclic Prefix (CP).

In one embodiment, the first time window is a consecutive duration.

In one embodiment, a burst to which the first time window belongs is located before the Q time sub-pool(s) in time domain.

In one embodiment, the first sub-band is deployed on Unlicensed Spectrum.

In one embodiment, the first sub-band is a carrier.

In one embodiment, the first sub-band is a Bandwidth Part (BWP).

In one embodiment, the first sub-band comprises a positive integer number of Physical Resource Block(s) (PRB) in frequency domain.

In one embodiment, the first sub-band comprises a positive integer number of contiguous PRBs in frequency domain.

In one embodiment, the first sub-band comprises a positive integer number of contiguous subcarriers in frequency domain.

In one embodiment, multi-antenna related receptions respectively employed by the Q energy detections are the same.

In one embodiment, the Q energy detection(s) is(are) used to determine whether the first sub-band is idle.

In one embodiment, the Q energy detection(s) is(are) used to determine whether the first sub-band can be used by the first node for transmitting a radio signal.

In one embodiment, the Q energy detection(s) is(are) used to determine whether the first sub-band can be used by the first node for transmitting a radio signal spatially correlated to the Q energy detection(s).

In one embodiment, the Q energy detection(s) is(are) energy detection(s) in Listen Before Talk (LBT), for the detailed definition of the LBT, refer to 3GPPTR36.889.

In one embodiment, the Q energy detection(s) is(are) energy detection(s) in Clear Channel Assessment (CCA), for the detailed definition of the CCA, refer to 3GPPTR36.889.

In one embodiment, any of the Q energy detection(s) is implemented in a way defined by 3GPP TS36.213, section 15.

In one embodiment, any of the Q energy detection(s) is implemented in a way of energy detection in WiFi.

In one embodiment, any of the Q energy detection(s) is implemented by measuring Received Signal Strength Indication (RSSI).

In one embodiment, any of the Q energy detection(s) is implemented in a way of energy detection in LTE LAA.

In one embodiment, time-domain resources occupied by any of the Q time sub-pool(s) are contiguous.

In one embodiment, the Q time sub-pools are mutually orthogonal (that is, non-overlapping) in time domain.

In one embodiment, any of the Q time sub-pool(s) lasts either 16 μs or 9 μs.

In one embodiment, at least two of the Q time sub-pools are of unequal durations.

In one embodiment, any two of the Q time sub-pools are of equal duration.

In one embodiment, time-domain resources occupied by the Q time sub-pool(s) are contiguous.

In one embodiment, at least two of the Q time sub-pools occupy non-consecutive time-domain resources.

In one embodiment, any two of the Q time sub-pools occupy non-consecutive time-domain resources.

In one embodiment, any time sub-pool of the Q time sub-pool(s) is a slot duration.

In one embodiment, any time sub-pool of the Q time sub-pool(s) is a Tsl, wherein the Tsl is a slot duration, for detailed definition of the Tsl, refer to 3GPP TS36.213, section 15.

In one embodiment, any of the Q time sub-pools other than an earliest time sub-pool is a slot duration.

In one embodiment, any of the Q time sub-pools other than an earliest time sub-pool is a Tsl, wherein the Tsl is a slot duration, for detailed definition of the Tsl, refer to 3GPP TS36.213, section 15.

In one embodiment, there is at least one time sub-pool that lasts 16 μs among the Q time sub-pool(s).

In one embodiment, there is at least one time sub-pool that lasts 9 μs among the Q time sub-pool(s).

In one embodiment, an earliest time sub-pool among the Q time sub-pools lasts 16 μs.

In one embodiment, a latest time sub-pool among the Q time sub-pools lasts 9 μs.

In one embodiment, the Q time sub-pool(s) comprises (comprise) listening time in Cat 4 LBT.

In one embodiment, the Q time sub-pool(s) comprises (comprise) slot durations comprised in a defer duration and slot durations comprised in backoff time in Cat 4 LBT.

In one embodiment, the Q time sub-pool(s) comprises (comprise) slot durations comprised in a defer duration and slot durations comprised in backoff time in Type 1 UL channel access procedure, and the first node is a UE.

In one embodiment, the Q time sub-pool(s) comprises (comprise) slot durations in an initial CCA and an Enhanced Clear Channel Assessment (eCCA).

In one embodiment, the Q detection value(s) is(are) respectively obtained from the Q energy detection(s).

In one embodiment, the Q detection value(s) is(are) respectively Q received power(s) acquired by the first node's sensing power of all radio signals in Q time unit(s) respectively on the first sub-band and averaging in time; the Q time unit(s) is(are) consecutive duration(s) respectively in the Q time sub-pool(s).

In one subembodiment, any of the Q time unit(s) lasts no shorter than 4 μs.

In one embodiment, the Q detection value(s) is(are) respectively Q received energy(energies) acquired by the first node's sensing energy of all radio signals in Q time unit(s) respectively on the first sub-band and averaging in time; the Q time unit(s) is(are) consecutive duration(s) respectively in the Q time sub-pool(s).

In one subembodiment, any of the Q time unit(s) lasts no shorter than 4 μs.

In one embodiment, any given energy detection of the Q energy detection(s) means that the first node monitors a received power in a given time unit, and the given time unit is a consecutive duration in one of the Q time sub-pool(s) that corresponds to the given energy detection.

In one embodiment, any given energy detection of the Q energy detection(s) means that the first node monitors a received energy in a given time unit, and the given time unit is a consecutive duration in one of the Q time sub-pool(s) that corresponds to the given energy detection.

In one embodiment, a given radio signal being spatially associated with a given energy detection means that the given radio signal comprises k sub-signal(s), of which at least one sub-signal is spatially correlated to the given energy detection, k being a positive integer.

In one embodiment, a given radio signal being spatially associated with a given energy detection means that the given radio signal comprises k sub-signal(s), of which a sub-signal is spatially correlated to the given energy detection, k being a positive integer.

In one embodiment, a given radio signal being spatially associated with a given energy detection means that the given radio signal comprises k sub-signal(s), of which each sub-signal is spatially correlated to the given energy detection, k being a positive integer.

Embodiment 2

Figure 2:
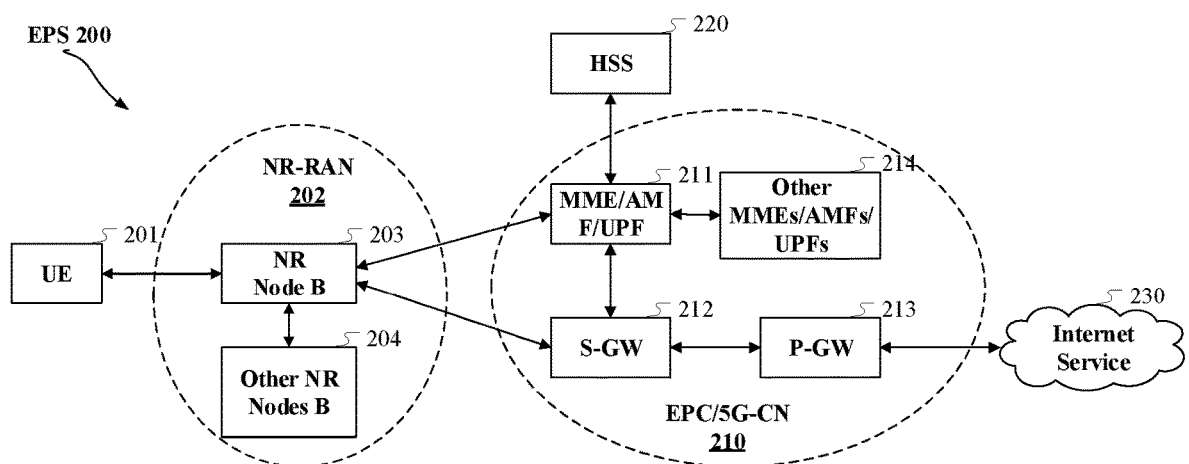
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of NR 5G, Long-Term Evolution (LTE), and Long-Term Evolution Advanced (LTE-A) systems. The NR 5G or LTE network architecture 200 may be called an Evolved Packet System (EPS) 200, which may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, Global Positioning Systems (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises operator-compatible IP services, specifically including Internet, Intranet, IP Multimedia Subsystem (IMS) and Packet Switching Streaming (PSS) services.

In one embodiment, the UE 201 corresponds to the first node in the present disclosure, and the first node is a UE.

In one embodiment, the gNB 203 corresponds to the first node in the present disclosure, and the first node is a base station.

In one embodiment, the UE 201 supports wireless communications with data transmitted on Unlicensed Spectrum.

In one embodiment, the gNB 203 supports wireless communications with data transmitted on Unlicensed Spectrum.

In one embodiment, the UE 201 supports wireless communications with massive MIMO.

In one embodiment, the gNB 203 supports wireless communications with massive MIMO.

Embodiment 3

Figure 3:
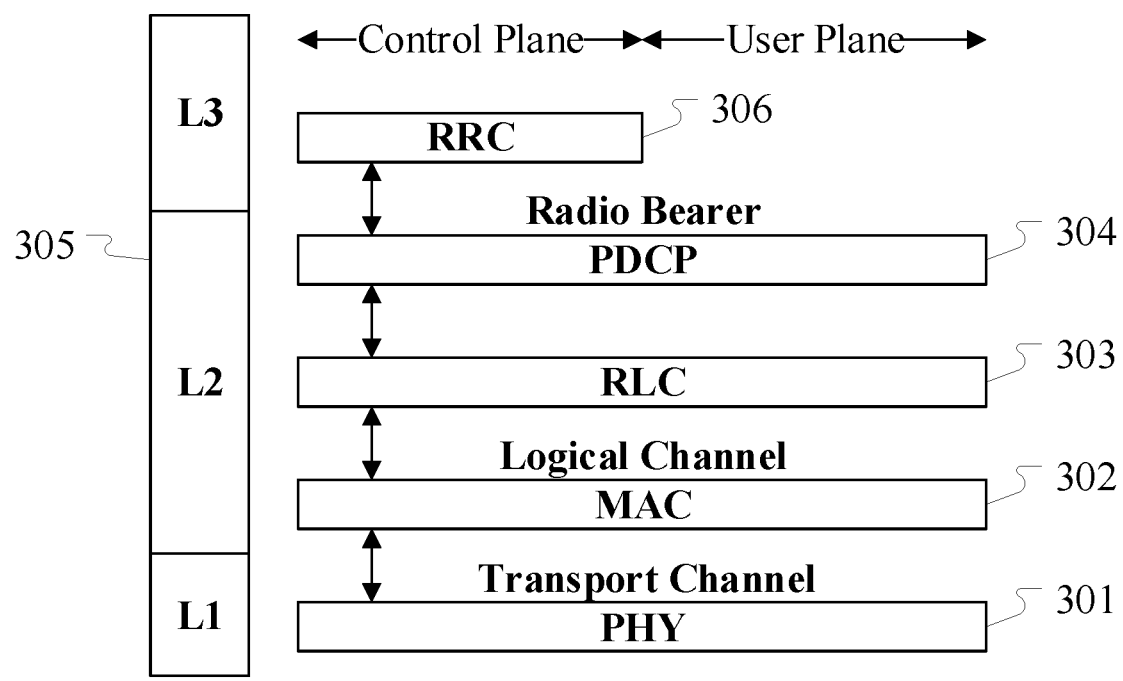
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane, as shown in FIG. 3.

FIG. 3 is a schematic diagram illustrating a radio protocol architecture of a user plane and a control plane. In FIG. 3, the radio protocol architecture for a UE and a base station (gNB or eNB) is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the UE and the gNB via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the gNBs of the network side. Although not described in FIG. 3, the UE may comprise several higher-layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce radio transmission overhead. The PDCP sublayer 304 provides security by encrypting a packet and provides support for UE handover between gNBs. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between UEs various radio resources (i.e., resource blocks) in a cell. The MAC sublayer 302 is also in charge of HARQ operation. In the control plane, the radio protocol architecture of the UE and the gNB is almost the same as the radio protocol architecture in the user plane on the PHY 301 and the L2 305, but there is no header compression for the control plane. The control plane also comprises an RRC sublayer 306 in the layer 3 (L3). The RRC sublayer 306 is responsible for acquiring radio resources (i.e., radio bearer) and configuring the lower layer using an RRC signaling between the gNB and the UE.

In one embodiment, the radio protocol architecture in FIG. 3 is applicable to the first node in the present disclosure.

In one embodiment, the T first-type radio signals of the present disclosure are generated by the PHY 301.

In one embodiment, the T second-type radio signals of the present disclosure are generated by the PHY 301.

In one embodiment, the Q energy detection(s) of the present disclosure is(are) generated by the PHY 301.

In one embodiment, the third-type radio signal of the present disclosure is generated by the PHY 301.

In one embodiment, the S fourth-type radio signal(s) of the present disclosure is(are) generated by the PHY 301.

In one embodiment, the fifth radio signal of the present disclosure is generated by the PHY 301.

In one embodiment, the first information of the present disclosure is generated by the PHY 301.

In one embodiment, the first information of the present disclosure is generated by the MAC sublayer 302.

In one embodiment, the first information of the present disclosure is generated by the RRC sublayer 306.

Embodiment 4

Figure 4:
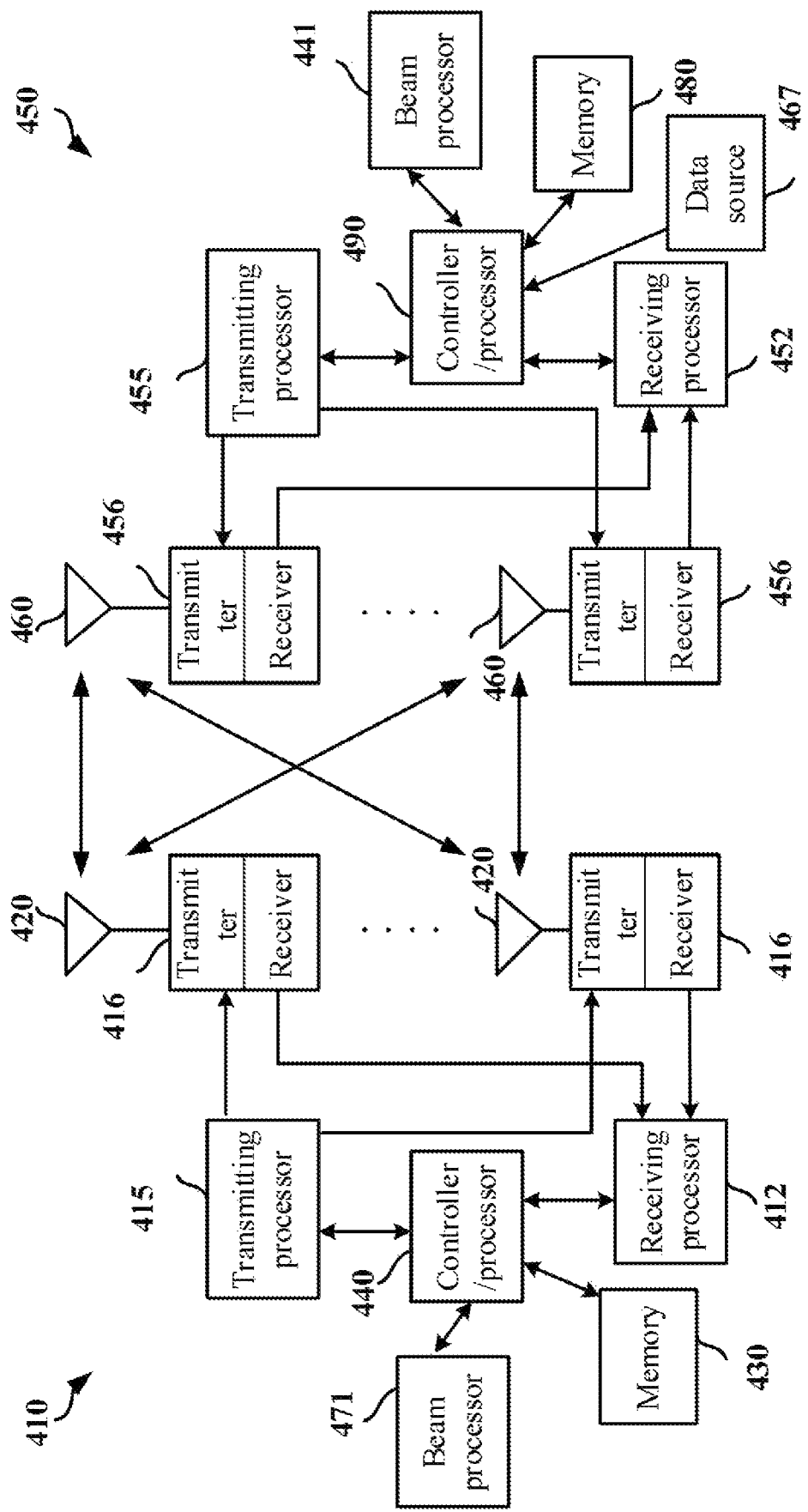
FIG. 4 illustrates a schematic diagram of a New Radio (NR) node and a UE according to one embodiment of the present disclosure.

Embodiment 4 illustrates a schematic diagram of a New Radio (NR) node and a UE according to the present disclosure, as shown in FIG. 4. FIG. 4 is a block diagram of a gNB 410 in communication with a UE 450 in an access network.

A base station (410) comprises a controller/processor 440, a memory 430, a receiving processor 412, a transmitting processor 415, a transmitter/receiver 416 and an antenna 420.

A UE (450) comprises a controller/processor 490, a memory 480, a data source 467, a transmitting processor 455, a receiving processor 452, a transmitter/receiver 456 and antenna 460.

In downlink (DL) transmission, processes relevant to the base station 410 comprise the following:

A higher-layer packet is provided to the controller/processor 440, and the controller/processor 440 provides header compression, encryption, packet segmentation and reordering as well as multiplexing and demultiplexing between a logical channel and a transport channel so as to implement the L2 layer protocols used for the user plane and the control plane; the higher-layer packet may comprise data or control information, such as a Downlink Shared Channel (DL-SCH).

The controller/processor 440 is associated with the memory 430 that stores program code and data; the memory 430 can be a computer readable medium.

The controller/processor 440 comprises a scheduling unit for transmission requests, where the scheduling unit is used to schedule radio resources corresponding to transmission requests.

The beam processor 471 determines T first-type radio signals, S third-type radio signals and perform Q energy detection(s).

The transmitting processor 415 receives bit flows output from the controller/processor 440 and provides various signal transmitting processing functions used for the L1 layer (that is PHY), including coding, interleaving, scrambling, modulating, power control/allocation and generation of physical layer control signaling (such as PBCH, PDCCH, PHICH, PCFICH and a reference signal).

The transmitter 416 is configured to convert a baseband signal provided from the transmitting processor 415 into a radio frequency signal which is to be transmitted via the antenna 420; each transmitter 416 performs sampling processing on respectively input symbol stream to acquire respective sampled signal stream. And each transmitter 416 further processes respectively sampled stream, for instance, by digital-to-analogue conversion, amplification, filtering and upconversion, to obtain a downlink signal.

In DL transmission, processes relevant to the UE 450 may comprise the following:

The receiver 456 is used to convert a radio frequency signal received via the antenna 460 into a baseband signal to be provided to the receiving processor 452;

The receiving processor 452 provides various signal receiving processing functions used for the L1 layer (that is PHY), including decoding, de-interleaving, descrambling, demodulating and extraction of physical layer control signaling.

The beam processor 441 determines T first-type radio signals and S third-type radio signal(s).

The controller/processor 490 receives bit flows output from the receiving processor 452, and provides header decompression, decryption, packet segmentation and reordering as well as multiplexing and demultiplexing between a logical channel and a transport channel so as to implement the L2 layer protocols used for the user plane and the control plane.

The controller/processor 490 is associated with the memory 480 that stores program code and data; the memory 480 may be called a computer readable medium.

In uplink (UL) transmission, processes relevant to the base station 410 comprise the following:

The receiver 416 receives a radio frequency signal via a corresponding antenna 420, converting the radio frequency signal into a baseband signal and providing the baseband signal to the receiving processor 412.

The receiving processor 412 provides various signal receiving processing functions used for the L1 layer (that is PHY), including decoding, de-interleaving, descrambling, demodulation and extraction of physical layer control signaling.

The controller/processor 440 implements the functions of the L2 layer, and is associated with the memory 430 that stores program code and data.

The controller/processor 440 provides demultiplexing between a transport channel and a logical channel, packet reassembling, decryption, header decompression and control signal processing so as to recover a higher-layer packet from the UE 450; the higher-layer packet may be provided to a core network.

The beam processor 471 determines T first-type radio signals and S third-type radio signal(s).

In UL, processes relevant to the UE 450 comprise the following:

The data source 467 provides a higher-layer packet to the controller/processor 490. The data source 467 represents all protocol layers above the L2 layer.

The transmitter 456 transmits a radio frequency signal via a corresponding antenna 460, converting a baseband signal into a radio frequency signal and providing the radio frequency signal to the corresponding antenna 460.

The transmitting processor 455 provides various signal receiving processing functions used for the L1 layer (i.e., PHY), including decoding, de-interleaving, descrambling, demodulation and extraction of physical layer control signaling.

The controller/processor 490 performs header compression, encryption, packet segmentation and reordering as well as multiplexing between a logical channel and a transport channel based on radio resources allocation of the gNB410, thereby implementing the L2 layer functions used for the user plane and the control plane.

The controller/processor 490 is also in charge of HARQ operation, retransmission of a lost packet and a signaling to the gNB410.

The beam processor 441 determines T first-type radio signals, S third-type radio signal(s) and performs Q energy detection(s).

In one subembodiment, the UE 450 comprises at least one processor and at least one memory. The at least one memory includes computer program codes. The at least one memory and the computer program codes are configured to be used in collaboration with the at least one processor. The UE 450 at least receives T first-type radio signals, and transmits T second-type radio signals in a first time window; and performs Q energy detection(s) respectively in Q time sub-pool(s) on a first sub-band to obtain Q detection value(s); herein the T second-type radio signals respectively correspond to the T first-type radio signals; at least one multi-carrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a UE.

In one subembodiment, the UE 450 comprises a memory that stores a computer readable instruction program. The computer readable instruction program generates actions when executed by at least one processor, which include: receiving T first-type radio signals, and transmitting T second-type radio signals in a first time window; and performing Q energy detection(s) respectively in Q time sub-pool(s) on a first sub-band to obtain Q detection value(s); herein the T second-type radio signals respectively correspond to the T first-type radio signals; at least one multi-carrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a UE.

In one subembodiment, the gNB 410 comprises at least one processor and at least one memory. The at least one memory includes computer program codes. The at least one memory and the computer program codes are configured to be used in collaboration with the at least one processor. The gNB 410 at least receives T first-type radio signals, and transmits T second-type radio signals in a first time window; and performs Q energy detection(s) respectively in Q time sub-pool(s) on a first sub-band to obtain Q detection value(s); herein the T second-type radio signals respectively correspond to the T first-type radio signals; at least one multicarrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station.

In one subembodiment, the gNB 410 comprises a memory that stores a computer readable instruction program. The computer readable instruction program generates actions when executed by at least one processor, which include: receiving T first-type radio signals, and transmitting T second-type radio signals in a first time window; and performing Q energy detection(s) respectively in Q time sub-pool(s) on a first sub-band to obtain Q detection value(s); herein the T second-type radio signals respectively correspond to the T first-type radio signals; at least one multi-carrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station.

In one embodiment, the UE 450 corresponds to the first node of the present disclosure, and the first node is a UE.

In one embodiment, the gNB410 corresponds to the first node of the present disclosure, and the first node is a base station.

In one subembodiment, at least the first two of the receiver 456, the receiving processor 452 and the controller/processor 490 are used to receive the T first-type radio signals of the present disclosure; the first node of the present disclosure is a UE.

In one subembodiment, at least the first two of the transmitter 416, the transmitting processor 415 and the controller/processor 440 are used to transmit the T first-type radio signals of the present disclosure; the first node of the present disclosure is a UE.

In one subembodiment, at least the first two of the receiver 456, the receiving processor 452 and the controller/processor 490 are used to receive the S third-type radio signal(s) of the present disclosure; the first node of the present disclosure is a UE.

In one subembodiment, at least the first two of the transmitter 416, the transmitting processor 415 and the controller/processor 440 are used to transmit the S third-type radio signal(s) of the present disclosure; the first node of the present disclosure is a UE.

In one subembodiment, at least the first two of the receiver 456, the receiving processor 452 and the controller/processor 490 are used to receive the first information of the present disclosure; the operating in the present disclosure is receiving; and the first node of the present disclosure is a UE.

In one subembodiment, at least the first two of the transmitter 416, the transmitting processor 415 and the controller/processor 440 are used to transmit the first information of the present disclosure; the operating in the present disclosure is receiving; and the first node of the present disclosure is a UE.

In one subembodiment, at least the first two of the receiver 456, the receiving processor 452 and the controller/processor 490 are used to perform Q energy detection(s) respectively in Q time sub-pool(s) on a first sub-band of the present disclosure; the first node of the present disclosure is a UE.

In one subembodiment, at least the first two of the transmitter 456, the transmitting processor 455 and the controller/processor 490 are used to transmit the T second-type radio signals of the present disclosure in the first time window of the present disclosure; the first node of the present disclosure is a UE.

In one subembodiment, at least the first two of the receiver 416, the receiving processor 412 and the controller/processor 440 are used to receive the T second-type radio signals of the present disclosure in the first time window of the present disclosure; the first node of the present disclosure is a UE.

In one subembodiment, at least the first two of the transmitter 456, the transmitting processor 455 and the controller/processor 490 are used to transmit the S fourth-type radio signal(s) of the present disclosure in the second time window of the present disclosure; the first node of the present disclosure is a UE.

In one subembodiment, at least the first two of the receiver 416, the receiving processor 412 and the controller/processor 440 are used to receive the S fourth-type radio signal(s) of the present disclosure in the second time window of the present disclosure; the first node of the present disclosure is a UE.

In one subembodiment, at least the first two of the transmitter 456, the transmitting processor 455 and the controller/processor 490 are used to transmit the fifth radio signal of the present disclosure; the first node of the present disclosure is a UE.

In one subembodiment, at least the first two of the receiver 416, the receiving processor 412 and the controller/processor 440 are used to receive the fifth radio signal of the present disclosure; the first node of the present disclosure is a UE.

In one subembodiment, at least the first two of the receiver 456, the receiving processor 452 and the controller/processor 490 are used to receive the T second-type radio signals of the present disclosure in the first time window of the present disclosure; the first node of the present disclosure is a base station.

In one subembodiment, at least the first two of the transmitter 416, the transmitting processor 415 and the controller/processor 440 are used to transmit the T second-type radio signals of the present disclosure in the first time window of the present disclosure; the first node of the present disclosure is a base station.

In one subembodiment, at least the first two of the receiver 456, the receiving processor 452 and the controller/processor 490 are used to receive the S fourth-type radio signal(s) of the present disclosure in the second time window of the present disclosure; the first node of the present disclosure is a base station.

In one subembodiment, at least the first two of the transmitter 416, the transmitting processor 415 and the controller/processor 440 are used to transmit the S fourth-type radio signal(s) of the present disclosure in the second time window of the present disclosure; the first node of the present disclosure is a base station.

In one subembodiment, at least the first two of the receiver 456, the receiving processor 452 and the controller/processor 490 are used to receive the fifth radio signal of the present disclosure; the first node of the present disclosure is a base station.

In one subembodiment, at least the first two of the transmitter 416, the transmitting processor 415 and the controller/processor 440 are used to transmit the fifth radio signal of the present disclosure; the first node of the present disclosure is a base station.

In one subembodiment, at least the first two of the receiver 456, the receiving processor 452 and the controller/processor 490 are used to receive the first information of the present disclosure; the first node of the present disclosure is a base station.

In one subembodiment, at least the first two of the transmitter 416, the transmitting processor 415 and the controller/processor 440 are used to transmit the first information of the present disclosure; the first node of the present disclosure is a base station.

In one subembodiment, at least the first two of the transmitter 456, the transmitting processor 455 and the controller/processor 490 are used to transmit the T first-type radio signals of the present disclosure; the first node of the present disclosure is a base station.

In one subembodiment, at least the first two of the receiver 416, the receiving processor 412 and the controller/processor 440 are used to receive the T first-type radio signals of the present disclosure; the first node of the present disclosure is a base station.

In one subembodiment, at least the first two of the transmitter 456, the transmitting processor 455 and the controller/processor 490 are used to transmit the S third-type radio signal(s) of the present disclosure; the first node of the present disclosure is a base station.

In one subembodiment, at least the first two of the receiver 416, the receiving processor 412 and the controller/processor 440 are used to receive the S third-type radio signal(s) of the present disclosure; the first node of the present disclosure is a base station.

In one subembodiment, at least the first two of the receiver 416, the receiving processor 412 and the controller/processor 440 are used to perform the Q energy detection(s) of the present disclosure respectively in the Q time sub-pool(s) on the first sub-band of the present disclosure; the first node of the present disclosure is a base station.

Embodiment 5

Figure 5:
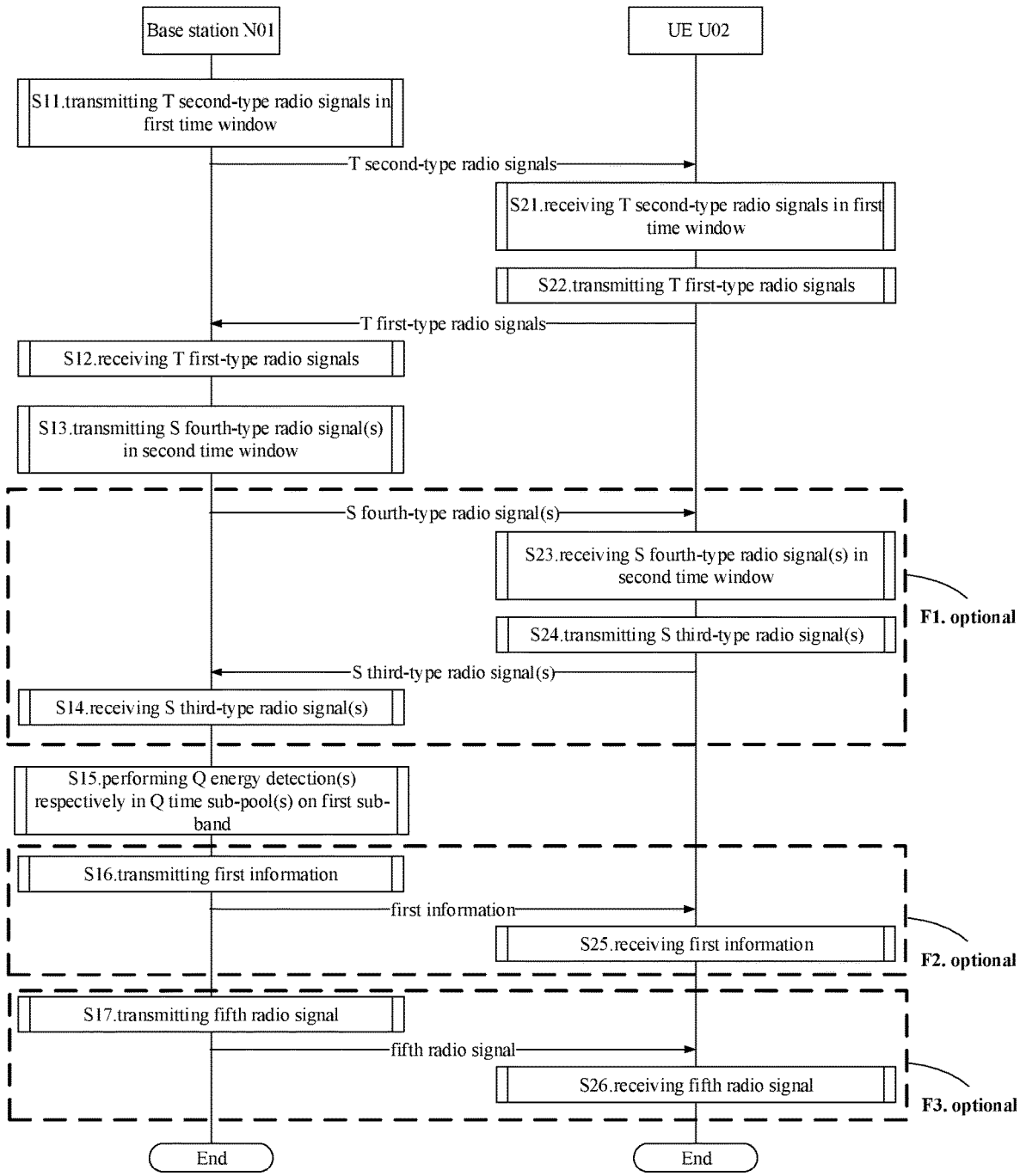
FIG. 5 illustrates a flowchart of wireless transmission according to one embodiment of the present disclosure.

Embodiment 5 illustrates a flowchart of wireless transmission, as shown in FIG. 5. In FIG. 5, a base station N01 is a maintenance base station for a serving cell of a UE U02. In FIG. 5, boxes F1, F2 and F3 are optional, respectively.

The N01 transmits T second-type radio signals in a first time window in step S11; and receives T first-type radio signals in step S12; transmits S fourth-type radio signal(s) in a second time window in step S13; and receives S third-type radio signal(s) in step S14; performs Q energy detection(s) respectively in the Q time sub-pool(s) on the first sub-band to obtain Q detection value(s) in step S15; transmits first information in step S16; and transmits a fifth radio signal in step S17.

The U02 receives T second-type radio signals in a first time window in step S21; and transmits T first-type radio signals in step S22; receives S fourth-type radio signal(s) in a second time window in step S23; and transmits S third-type radio signal(s) in step S24; receives first information in step S25; and receives a fifth radio signal in step S26.

In Embodiment 5, the T second-type radio signals respectively correspond to the T first-type radio signals; at least one multicarrier symbol is occupied by each of the T second-type radio signals; among the T first-type radio signals there is(are) only T1 first-type radio signal(s) being used by the base station N01 to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals. The first node is a base station. The T first-type radio signals respectively indicate whether the T second-type radio signals are correctly received. The S fourth-type radio signal(s) respectively corresponds(correspond) to the S third-type radio signal(s); the S third-type radio signal(s) and the T1 first-type radio signal(s) are jointly used to determine the Q, and S is a positive integer; each of the S fourth-type radio signal(s) is spatially associated with the Q energy detection(s). A start time for time-domain resources occupied by the fifth radio signal is no earlier than an end time for the Q time sub-pool(s). The first information comprises scheduling information of the fifth radio signal.

In one embodiment, the Q energy detection(s) is(are) respectively energy detection(s) in a downlink access detection.

In one embodiment, the T first-type radio signals explicitly indicate whether the T second-type radio signals are correctly received respectively.

In one embodiment, the T first-type radio signals implicitly indicate whether the T second-type radio signals are correctly received respectively.

In one embodiment, each of the T first-type radio signals comprises Hybrid Automatic Repeat reQuest ACKnowledgement (HARQ-ACK).

In one embodiment, any of the T first-type radio signals comprises Uplink control information (UCI).

In one embodiment, the T first-type radio signals are respectively transmitted on T uplink physical layer control channels (i.e., uplink channels only capable of carrying physical layer signaling).

In one subembodiment, the T uplink physical layer control channels are Physical Uplink Control CHannels (PUCCHs) respectively.

In one subembodiment, the T uplink physical layer control channels are short PUCCHs (sPUCCHs) respectively.

In one subembodiment, the T uplink physical layer control channels are New Radio PUCCHs (NR-PUCCHs) respectively.

In one subembodiment, the T uplink physical layer control channels are Narrow Band PUCCHs (NB-PUCCHs) respectively.

In one embodiment, the T first-type radio signals are respectively transmitted on T uplink physical layer data channels (i.e., uplink channels capable of carrying physical layer data).

In one subembodiment, the T uplink physical layer data channels are Physical Uplink Shared CHannels (PUSCHs) respectively.

In one subembodiment, the T uplink physical layer data channels are short PUSCHs (sPUSCHs) respectively.

In one subembodiment, the T uplink physical layer data channels are New Radio PUSCHs (NR-PUSCHs) respectively.

In one subembodiment, the T uplink physical layer data channels are Narrow Band PUSCHs (NB-PUSCHs) respectively.

In one embodiment, any of the T second-type radio signals comprises data.

In one embodiment, the T second-type radio signals are respectively transmitted on T downlink physical layer data channels (i.e., downlink channels capable of carrying physical layer data).

In one subembodiment, the T downlink physical layer data channels are Physical Downlink Shared CHannels (PDSCHs) respectively.

In one subembodiment, the T downlink physical layer data channels are short PDSCHs (sPDSCHs) respectively.

In one subembodiment, the T downlink physical layer data channels are New Radio PDSCHs (NR-PDSCHs) respectively.

In one subembodiment, the T downlink physical layer data channels are Narrow Band PDSCHs (NB-PDSCHs) respectively.

In one embodiment, transmission channels corresponding to the T second-type radio signals are respectively DownLinkShared Channels (DL-SCHs).

In one embodiment, the T1 second-type radio signal(s) comprises(comprise) W sub-signal(s), and the T1 first-type radio signal(s) indicates(indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

In one subembodiment, the T1 second-type radio signal(s) comprises(comprise) W sub-signal(s), and the T1 first-type radio signal(s) explicitly indicates(indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

In one subembodiment, the T1 second-type radio signal(s) comprises(comprise) W sub-signal(s), and the T1 first-type radio signal(s) implicitly indicates(indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

In one embodiment, the T1 first-type radio signal(s) is(are) used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

In one embodiment, any of the S third-type radio signal(s) comprises control information.

In one embodiment, the S third-type radio signal(s) is(are) transmitted on the first sub-band.

In one embodiment, the S third-type radio signal(s) is(are) transmitted on a frequency band other than the first sub-band.

In one embodiment, the S third-type radio signal(s) is(are) transmitted on a frequency band deployed on Licensed Spectrum other than the first sub-band.

In one embodiment, the S third-type radio signal(s) is(are) transmitted on a frequency band deployed on Unlicensed Spectrum other than the first sub-band.

In one embodiment, the S third-type radio signal(s) is(are) transmitted on a frequency band deployed on Licensed Spectrum.

In one embodiment, each of the S third-type radio signal(s) comprises HARQ-ACK.

In one embodiment, any of the S third-type radio signal(s) comprises UCI, and the first node is a base station.

In one embodiment, the S third-type radio signal(s) is(are) respectively transmitted on S uplink physical layer control channel(s) (i.e., uplink channel(s) only capable of carrying physical layer signaling).

In one subembodiment, each of the S uplink physical layer control channel(s) is a PUCCH.

In one subembodiment, each of the S uplink physical layer control channel(s) is an sPUCCH.

In one subembodiment, each of the S uplink physical layer control channel(s) is an NR-PUCCH.

In one subembodiment, each of the S uplink physical layer control channel(s) is an NB-PUCCH.

In one embodiment, the S third-type radio signal(s) is(are) respectively transmitted on S uplink physical layer data channel(s) (i.e., uplink channel(s) capable of carrying physical layer data).

In one subembodiment, each of the S uplink physical layer data channel(s) is a PUSCH.

In one subembodiment, each of the S uplink physical layer data channel(s) is an sPUSCH.

In one subembodiment, each of the S uplink physical layer data channel(s) is an NR-PUSCH.

In one subembodiment, each of the S uplink physical layer data channel(s) is an NB-PUSCH.

In one embodiment, any of the S fourth-type radio signal(s) comprises data.

In one embodiment, the S fourth-type radio signal(s) is(are) transmitted on the first sub-band.

In one embodiment, frequency-domain resources occupied by the S fourth-type radio signal(s) belong to the first sub-band.

In one embodiment, frequency-domain resources occupied by the S fourth-type radio signal(s) comprise the first sub-band.

In one embodiment, time-domain resources occupied by the S fourth-type radio signals are the same.

In one embodiment, time-domain resources occupied by at least two of the S fourth-type radio signals are the same.

In one embodiment, multicarrier symbols occupied by the S fourth-type radio signals are the same.

In one embodiment, time-domain resources occupied by the S fourth-type radio signals are mutually orthogonal.

In one embodiment, time-domain resources occupied by at least two of the S fourth-type radio signals are mutually orthogonal.

In one embodiment, frequency-domain resources occupied by the S fourth-type radio signals are mutually orthogonal (that is, non-overlapping).

In one embodiment, there is at least one subcarrier occupied by all the S fourth-type radio signals.

In one embodiment, frequency-domain resources occupied by the S fourth-type radio signals are the same.

In one embodiment, frequency-domain resources occupied by at least two of the S fourth-type radio signals are the same.

In one embodiment, frequency-domain resources occupied by at least two of the S fourth-type radio signals are mutually orthogonal (that is, non-overlapping).

In one embodiment, the S fourth-type radio signal(s) is(are) respectively transmitted on S downlink physical layer data channel(s) (i.e., downlink channel(s) capable of carrying physical layer data).

In one subembodiment, each of the S downlink physical layer data channel(s) is a PDSCH.

In one subembodiment, each of the S downlink physical layer data channel(s) is an sPDSCH.

In one subembodiment, each of the S downlink physical layer data channel(s) is an NR-PDSCH.

In one subembodiment, each of the S downlink physical layer data channel(s) is an NB-PDSCH.

In one embodiment, transmission channel(s) corresponding to S fourth-type radio signal(s) is(are) respectively DownLink Shared Channel(s) (DL-SCH).

In one embodiment, the second time window comprises one or more sub-frames.

In one embodiment, the second time window comprises a sub-frame.

In one embodiment, the second time window comprises multiple sub-frames.

In one embodiment, the second time window comprises one or more slots.

In one embodiment, the second time window comprises a slot.

In one embodiment, the second time window comprises multiple slots.

In one embodiment, the second time window comprises a positive integer number of multicarrier symbol(s).

In one embodiment, the second time window comprises a positive integer number of contiguous multicarrier symbols.

In one embodiment, the second time window is a consecutive duration.

In one embodiment, a burst to which the second time window belongs is located before the Q time sub-pool(s) in time domain.

In one embodiment, the second time window and the first time window are orthogonal (non-overlapping) in time domain.

In one embodiment, the second time window and the first time window belong to a same burst.

In one embodiment, the second time window and the first time window respectively belong to different bursts.

In one embodiment, a time interval between a burst to which a later time window between the second time window and the first time window belongs and time-domain resources occupied by the first information is no smaller than a first time interval.

In one subembodiment, the first time interval is a positive integer number of sub-frame(s).

In one subembodiment, the first time interval is 3 sub-frames.

In one subembodiment, the first time interval is a positive integer number of slot(s).

In one subembodiment, the first time interval is a positive integer number of multicarrier symbol(s).

In one subembodiment, the first time interval is predefined.

In one subembodiment, the first time interval is by default.

In one embodiment, the first node is a base station, and the S third-type radio signal(s) respectively indicates(indicate) whether the S fourth-type radio signal(s) is(are) correctly received.

In one subembodiment, the first node is a base station, and the S third-type radio signal(s) explicitly indicates(indicate) whether the S fourth-type radio signal(s) is(are) correctly received respectively.

In one subembodiment, the first node is a base station, and the S third-type radio signal(s) implicitly indicates(indicate) whether the S fourth-type radio signal(s) is(are) correctly received respectively.

In one embodiment, the S fourth-type radio signal(s) comprises(comprise) S1 sub-signal(s), and the S third-type radio signal(s) indicates(indicate) whether any of the S1 sub-signal(s) is correctly received, S1 being a positive integer no less than the S; among the S1 sub-signal(s) there is at least one sub-signal of all sub-signal(s) comprised in a same fourth-type radio signal of the S fourth-type radio signal(s) being spatially correlated to the Q energy detection(s); whether the S1 sub-signal(s) is(are) correctly received and whether the W sub-signal(s) is(are) correctly received are jointly used to determine the Q.

In one subembodiment, the S fourth-type radio signal(s) comprises(comprise) S1 sub-signal(s), and the S third-type radio signal(s) explicitly indicates(indicate) whether any of the S1 sub-signal(s) is correctly received, S1 being a positive integer no less than the S; among the S1 sub-signal(s) there is at least one sub-signal of all sub-signal(s) comprised in a same fourth-type radio signal of the S fourth-type radio signal(s) being spatially correlated to the Q energy detection(s); whether the S1 sub-signal(s) is(are) correctly received and whether the W sub-signal(s) is(are) correctly received are jointly used to determine the Q.

In one subembodiment, the S fourth-type radio signal(s) comprises(comprise) S1 sub-signal(s), and the S third-type radio signal(s) implicitly indicates(indicate) whether any of the S1 sub-signal(s) is correctly received, S1 being a positive integer no less than the S; among the S1 sub-signal(s) there is at least one sub-signal of all sub-signal(s) comprised in a same fourth-type radio signal of the S fourth-type radio signal(s) being spatially correlated to the Q energy detection(s); whether the S1 sub-signal(s) is(are) correctly received and whether the W sub-signal(s) is(are) correctly received are jointly used to determine the Q.

In one embodiment, the S third-type radio signal(s) and the T1 first-type radio signal(s) are jointly used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

In one embodiment, a start time for time-domain resources occupied by the fifth radio signal refers to an end time for the Q time sub-pool(s).

In one embodiment, a start time for time-domain resources occupied by the fifth radio signal is later than an end time for the Q time sub-pool(s).

In one embodiment, the fifth radio signal comprises at least one of data, control information or a reference signal.

In one embodiment, the fifth radio signal comprises data.

In one embodiment, the fifth radio signal comprises control information.

In one embodiment, the fifth radio signal comprises a reference signal.

In one embodiment, the fifth radio signal comprises data, control information and a reference signal.

In one embodiment, the fifth radio signal comprises data and control information.

In one embodiment, the fifth radio signal comprises control information and a reference signal.

In one embodiment, the fifth radio signal comprises data and a reference signal.

In one subembodiment, the data is downlink data, the control information is Downlink Control Information (DCI), while the reference signal comprises one or more of DeModulation Reference Signals (DMRS), Channel State Information-Reference Signal (CSI-RS), finetime/frequency Tracking Reference Signals (TRS) or Phase error Tracking Reference Signals (PRTS).

In one embodiment, the fifth radio signal is transmitted on the first sub-band.

In one embodiment, the scheduling information of the fifth radio signal comprises at least one of a Modulation and Coding Scheme (MCS), configuration information of DMRS, a HARQ process number, a Redundancy Version (RV), a New Data Indicator (NDI), occupied time-frequency resources, corresponding multi-antenna related transmission or corresponding multi-antenna related reception.

In one subembodiment, the fifth radio signal comprises data.

In one embodiment, the scheduling information of the fifth radio signal comprises at least one of occupied time-domain resources, occupied frequency-domain resources, occupied code-domain resources, a cyclic shift, an Orthogonal Cover Code (OCC), an occupied antenna port, corresponding multi-antenna related transmission or corresponding multi-antenna related reception.

In one subembodiment, the fifth radio signal comprises a reference signal.

In one embodiment, the fifth radio signal is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

In one embodiment, a transmission channel for the fifth radio signal is a DL-SCH.

In one embodiment, the fifth radio signal is spatially correlated to the Q energy detection(s).

In one embodiment, the first information is dynamically configured.

In one embodiment, the first information is carried by a physical layer signaling.

In one embodiment, the first information belongs to Downlink Control Information (DCI).

In one embodiment, the first information belongs to Downlink Grant DCI.

In one embodiment, the first information is a field of a piece of DCI, and the field comprises a positive integer number of bit(s).

In one embodiment, the first information is composed of multiple fields of a piece of DCI, and each field comprises a positive integer number of bit(s).

In one embodiment, the first information is carried by a downlink physical layer control channel (i.e., a downlink channel only capable of carrying physical layer signaling).

In one embodiment, the first information is carried by a Physical Downlink Control Channel (PDCCH).

In one embodiment, the first information is carried by a short PDCCH (sPDCCH).

In one embodiment, the first information is carried by a New Radio PDCCH (NR-PDCCH).

In one embodiment, the first information is carried by a NarrowBand PDCCH (NB-PDCCH).

In one embodiment, the first information is semi-statically configured.

In one embodiment, the first information is carried by a higher-layer signaling.

In one embodiment, the first information is carried by a Radio Resource Control (RRC) signaling.

In one embodiment, the first information is all or part of an Information Element (IE) in an RRC signaling.

In one embodiment, the first information is carried by a Medium Access Control (MAC) Control Element (CE).

In one embodiment, the first information is transmitted in a System Information Block (SIB).

In one embodiment, the first information is transmitted on the first sub-band.

In one embodiment, the first information is transmitted on a frequency band other than the first sub-band.

In one embodiment, the first information is transmitted on a frequency band deployed on Licensed Spectrum other than the first sub-band.

In one embodiment, the first information is transmitted on a frequency band deployed on Unlicensed Spectrum other than the first sub-band.

In one embodiment, the first information is transmitted on a frequency band deployed on Licensed Spectrum.

In one embodiment, the first information is transmitted on a downlink physical layer control channel (i.e., a downlink channel only capable of carrying physical layer signaling).

In one subembodiment, the downlink physical layer control channel is a PDCCH.

In one subembodiment, the downlink physical layer control channel is an sPDCCH.

In one subembodiment, the downlink physical layer control channel is an NR-PDCCH.

In one subembodiment, the downlink physical layer control channel is an NB-PDCCH.

In one embodiment, the first information is transmitted on a downlink physical layer data channel (i.e., a downlink channel capable of carrying physical layer data).

In one subembodiment, the downlink physical layer data channel is a PDSCH.

In one subembodiment, the downlink physical layer data channel is an sPDSCH.

In one subembodiment, the downlink physical layer data channel is an NR-PDSCH.

In one subembodiment, the downlink physical layer data channel is an NB-PDSCH.

Embodiment 6

Figure 6:
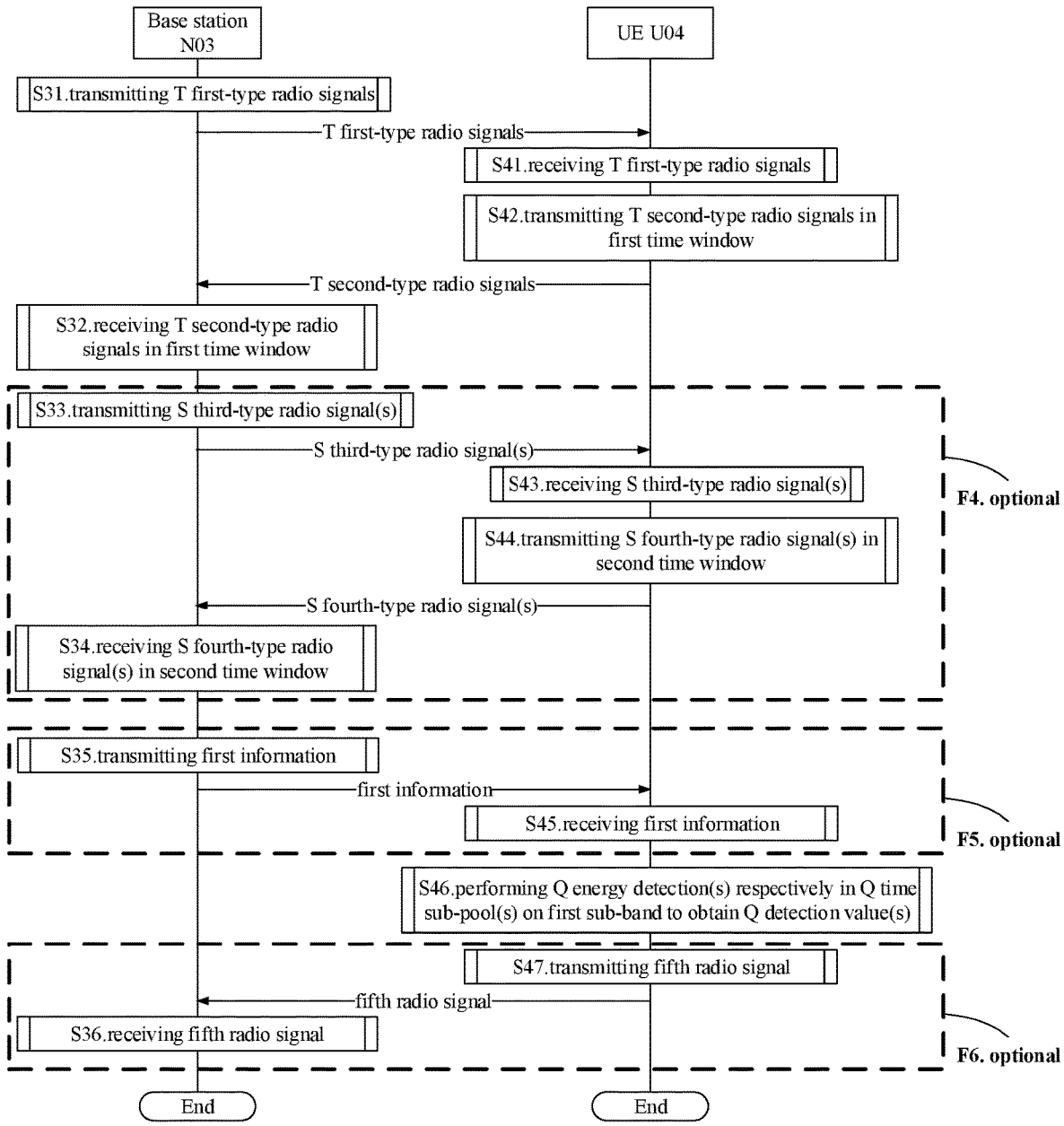
FIG. 6 illustrates a flowchart of wireless transmission according to another embodiment of the present disclosure.

Embodiment 6 illustrates another flowchart of wireless transmission, as shown in FIG. 6. In FIG. 6, a base station N03 is a maintenance base station for a serving cell of a UE U04. In FIG. 6, boxes F4, F5 and F6 are optional.

The N03 transmits T first-type radio signals in step S31; and receives T second-type radio signals in a first time window in step S32; transmits S third-type radio signal(s) in step S33; and receives S fourth-type radio signal(s) in a second time window in step S34; transmits first information in step S35; and receives a fifth radio signal in step S36.

The U04 receives T first-type radio signals in step S41; and transmits T second-type radio signals in a first time window in step S42; receives S third-type radio signal(s) in step S43; and transmits S fourth-type radio signal(s) in a second time window in step S44; receives first information in step S45; performs Q energy detection(s) respectively in Q time sub-pool(s) on a first sub-band in step S46 to obtain Q detection value(s); and transmits a fifth radio signal in step S47.

In Embodiment 6, the T second-type radio signals respectively correspond to the T first-type radio signals; at least one multicarrier symbol is occupied by each of the T second-type radio signals; among the T first-type radio signals there is(are) only T1 first-type radio signal(s) being used by the U04 to determine Q, wherein T is a positive integer greater than 1, the Q is a positive integer, and T1 is a positive integer less than the T; T1 second-type radio signal(s) of the T second-type radio signals that corresponds (correspond) to the T1 first-type radio signal(s) is(are) composed of second-type radio signal(s) spatially associated with the Q energy detection(s) among the T second-type radio signals; the first node is a UE, the T first-type radio signals respectively comprise scheduling information of the T second-type radio signals. The S fourth-type radio signal(s) respectively corresponds(correspond) to the S third-type radio signal(s); the S third-type radio signal(s) and the T1 first-type radio signal(s) are jointly used to determine the Q, and S is a positive integer; each of the S fourth-type radio signal(s) is spatially associated with the Q energy detection(s). A start time for time-domain resources occupied by the fifth radio signal is no earlier than an end time for the Q time sub-pool(s). The first information comprises scheduling information of the fifth radio signal.

In one embodiment, the Q energy detection(s) is(are) respectively energy detection(s) in an uplink access detection.

In one embodiment, any of the T first-type radio signals comprises DCI, and the first node is a UE.

In one embodiment, the T first-type radio signals are respectively transmitted on T downlink physical layer control channels (i.e., downlink channels only capable of carrying physical layer signaling).

In one subembodiment, the T downlink physical layer control channels are PDCCHs respectively.

In one subembodiment, the T downlink physical layer control channels are sPDCCHs respectively.

In one subembodiment, the T downlink physical layer control channels are NR-PDCCHs respectively.

In one subembodiment, the T downlink physical layer control channels are NB-PDCCHs respectively.

In one embodiment, the T second-type radio signals are respectively transmitted on T uplink physical layer control channels (i.e., uplink channels capable of carrying physical layer data).

In one subembodiment, the T uplink physical layer data channels are PUSCHs respectively.

In one subembodiment, the T uplink physical layer data channels are sPUSCHs respectively.

In one subembodiment, the T uplink physical layer data channels are NR-PUSCHs respectively.

In one subembodiment, the T uplink physical layer data channels are NB-PUSCHs respectively.

In one embodiment, transmission channels corresponding to the T second-type radio signals are respectively Uplink Shared Channels (UL-SCHs).

In one embodiment, scheduling information of any second-type radio signal of the T second-type radio signals comprises at least one of a Modulation and Coding Scheme (MCS), configuration information of DMRS, a HARQ process number, an RV, an NDI, occupied time-frequency resources, corresponding multi-antenna related transmission or corresponding multi-antenna related reception.

In one subembodiment, the configuration information of the DMRS comprises one or more of occupied time-domain resources, occupied frequency-domain resources, occupied code-domain resources, a cyclic shift, or an Orthogonal Cover Code (OCC).

In one embodiment, the T1 second-type radio signal(s) comprises(comprise) V sub-signal(s), and the T1 first-type radio signal(s) indicates(indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

In one subembodiment, the T1 second-type radio signal(s) comprises(comprise) V sub-signal(s), and the T1 first-type radio signal(s) explicitly indicates(indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

In one subembodiment, the T1 second-type radio signal(s) comprises(comprise) V sub-signal(s), and the T1 first-type radio signal(s) implicitly indicates(indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

In one embodiment, the T1 first-type radio signal(s) is(are) used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

In one embodiment, any of the S third-type radio signal(s) comprises DCI, and the first node is a UE.

In one embodiment, the S third-type radio signal(s) is(are) respectively transmitted on S downlink physical layer control channel(s) (i.e., downlink channel(s) only capable of carrying physical layer signaling).

In one subembodiment, each of the S downlink physical layer control channel(s) is a PDCCH.

In one subembodiment, each of the S downlink physical layer control channel(s) is an sPDCCH.

In one subembodiment, each of the S downlink physical layer control channel(s) is an NR-PDCCH.

In one subembodiment, each of the S downlink physical layer control channel(s) is an NB-PDCCH.

In one embodiment, the S fourth-type radio signal(s) is(are) respectively transmitted on S uplink physical layer data channel(s) (i.e., uplink channel(s) capable of carrying physical layer data).

In one subembodiment, each of the S uplink physical layer data channel(s) is a PUSCH.

In one subembodiment, each of the S uplink physical layer data channel(s) is an sPUSCH.

In one subembodiment, each of the S uplink physical layer data channel(s) is an NR-PUSCH.

In one subembodiment, each of the S uplink physical layer data channel(s) is an NB-PUSCH.

In one embodiment, transmission channel(s) corresponding to the S fourth-type radio signal(s) is(are) UL-SCH(s) respectively.

In one embodiment, the first node is a UE, and the S third-type radio signal(s) respectively comprises(comprise) scheduling information of the S fourth-type radio signal(s).

In one embodiment, scheduling information of any of the S fourth-type radio signal(s) comprises at least one of an MCS, configuration information of DMRS, a HARQ process number, an RV, an NDI, occupied time-frequency resources, corresponding multi-antenna related transmission or corresponding multi-antenna related reception.

In one subembodiment, the configuration information of the DMRS comprises one or more of occupied time-domain resources, occupied frequency-domain resources, occupied code-domain resources, a cyclic shift, or an OCC.

In one embodiment, the S fourth-type radio signal(s) comprises(comprise) S2 sub-signal(s), and the S third-type radio signal(s) indicates(indicate) whether any of the S2 sub-signal(s) comprises new data, S2 being a positive integer no less than the S; among the S2 sub-signal(s) there is at least one sub-signal of all sub-signal(s) comprised in a same fourth-type radio signal of the S fourth-type radio signal(s) being spatially correlated to the Q energy detection(s); whether the S2 sub-signal(s) comprises(comprise) new data and whether the V sub-signal(s) comprises (comprise) new data are jointly used to determine the Q.

In one subembodiment, the S fourth-type radio signal(s) comprises(comprise) S2 sub-signal(s), and the S third-type radio signal(s) explicitly indicates(indicate) whether any of the S2 sub-signal(s) comprises new data, S2 being a positive integer no less than the S; among the S2 sub-signal(s) there is at least one sub-signal of all sub-signal(s) comprised in a same fourth-type radio signal of the S fourth-type radio signal(s) being spatially correlated to the Q energy detection(s); whether the S2 sub-signal(s) comprises(comprise) new data and whether the V sub-signal(s) comprises (comprise) new data are jointly used to determine the Q.

In one subembodiment, the S fourth-type radio signal(s) comprises(comprise) S2 sub-signal(s), and the S third-type radio signal(s) implicitly indicates(indicate) whether any of the S2 sub-signal(s) comprises new data, S2 being a positive integer no less than the S; among the S2 sub-signal(s) there is at least one sub-signal of all sub-signal(s) comprised in a same fourth-type radio signal of the S fourth-type radio signal(s) being spatially correlated to the Q energy detection(s); whether the S2 sub-signal(s) comprises(comprise) new data and whether the V sub-signal(s) comprises (comprise) new data are jointly used to determine the Q.

In one embodiment, the S third-type radio signal(s) and the T1 first-type radio signal(s) are jointly used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

In one embodiment, the first information belongs to UpLink Grant DCI.

In one embodiment, the fifth radio signal comprises at least one of data, control information or a reference signal.

In one embodiment, the fifth radio signal comprises data.

In one embodiment, the fifth radio signal comprises control information.

In one embodiment, the fifth radio signal comprises a reference signal.

In one embodiment, the fifth radio signal comprises data, control information and a reference signal.

In one embodiment, the fifth radio signal comprises data and control information.

In one embodiment, the fifth radio signal comprises control information and a reference signal.

In one embodiment, the fifth radio signal comprises data and a reference signal.

In one subembodiment, the data refers to uplink data, the control information is UCI, while the reference signal comprises one or more of DMRS, a Sounding Reference Signal (SRS), or a PTRS.

In one embodiment, the fifth radio signal is transmitted on an uplink physical layer data channel (i.e., an uplink channel capable of carrying physical layer data).

In one subembodiment, the uplink physical layer data channel is a PUSCH.

In one subembodiment, the uplink physical layer data channel is an sPUSCH.

In one subembodiment, the uplink physical layer data channel is an NR-PUSCH.

In one subembodiment, the uplink physical layer data channel is an NB-PUSCH.

In one embodiment, a transmission channel for the fifth radio signal is a UL-SCH.

Embodiment 7

Figure 7:
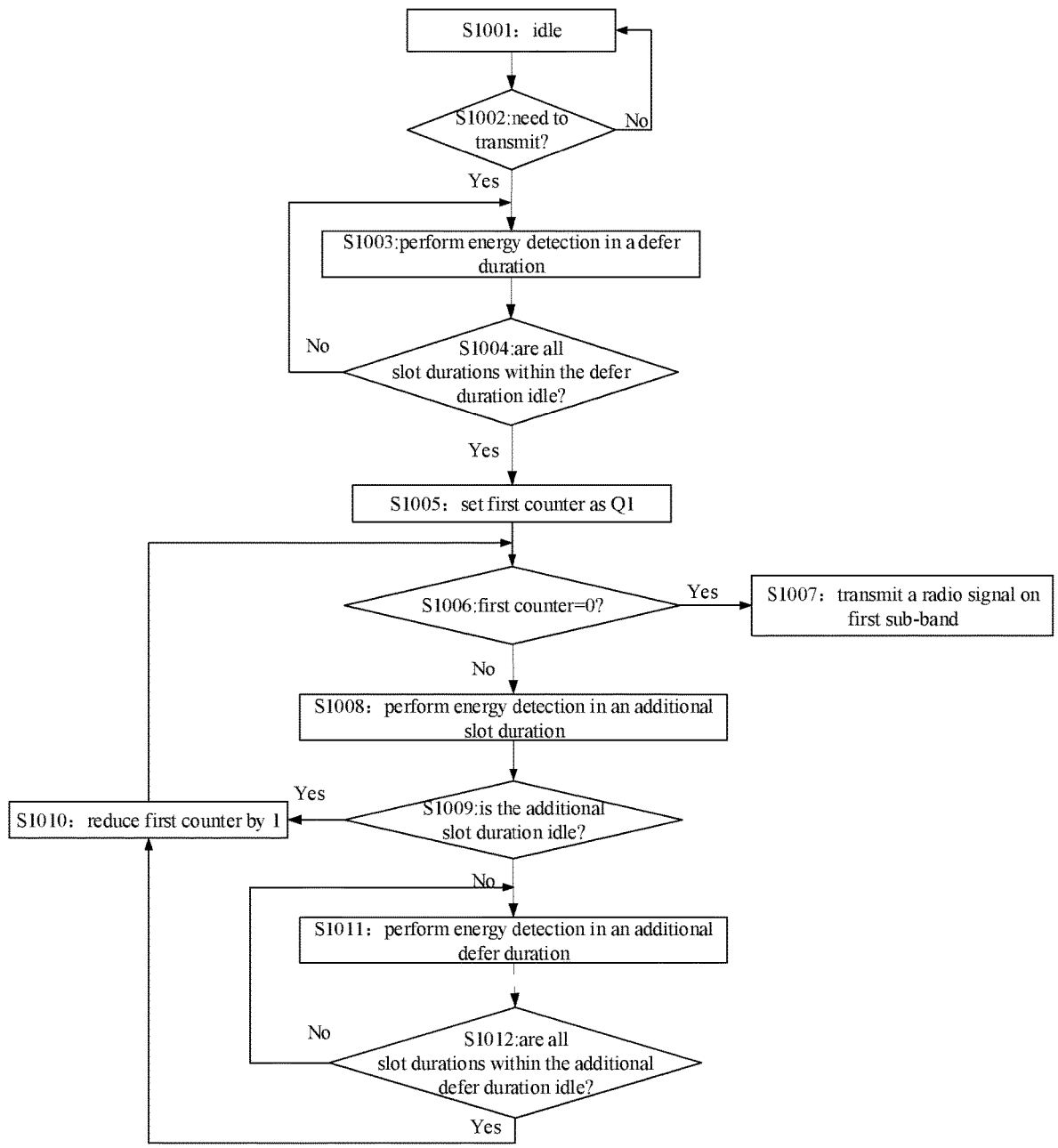
FIG. 7 illustrates a schematic diagram of a process of performing Q energy detection(s) respectively in Q time sub-pool(s) according to one embodiment of the present disclosure.

Embodiment 7 illustrates a schematic diagram of a process of performing Q energy detection(s) respectively in Q time sub-pool(s); as shown in FIG. 7.

In Embodiment 7, the first node of the present disclosure performs Q energy detection(s) respectively in Q time sub-pool(s) on a first sub-band of the present disclosure to obtain Q detection value(s). Each of Q1 detection value(s) among the Q detection value(s) is lower than a first threshold, and Q1 is a positive integer no greater than the Q. Q1 time sub-pool(s) is(are) time sub-pool(s) of the Q time sub-pool(s) respectively corresponding to the Q1 detection value(s). The process of the Q energy detection(s) can be depicted by the flowchart in FIG. 7.

In FIG. 7, the first node is idle in step S1001, and determines in step S1002 whether there is need to transmit; performs energy detection in a defer duration in step S1003; and determines in step S1004 whether all slot durations within the defer duration are idle, if yes, move forward to step S1005 to set a first counter as Q1; otherwise go back to step S1004; the first node determines whether the first counter is 0 in step S1006, if yes, move forward to step S1007 to transmit a radio signal on the first sub-band of the present disclosure; otherwise move forward to step S1008 to perform energy detection in an additional slot duration; the first node determines in step S1009 whether the additional slot duration is idle, if yes, move forward to step S1010 to reduce the first counter by 1 and then go back to step S1006; otherwise move forward to step S1011 to perform energy detection in an additional defer duration; the first node determines in step S1012 whether all slot durations within the additional defer duration are idle, if yes, move back to step S1010; otherwise go back to step S1011.

In Embodiment 7, a first given duration comprises a positive integer number of time sub-pool(s) of the Q time sub-pool(s), and the first given duration is any duration of all defer durations, all additional slot durations and all additional defer durations comprised in FIG. 7. A second given duration comprises one of the Q1 time sub-pool(s), and the second given duration is any duration of all additional slot durations and all additional defer durations determined to be idle through energy detection in FIG. 7.

In one embodiment, any slot duration within a given time duration comprises one of the Q time sub-pool(s); the given time duration is any duration of all defer durations, all additional slot durations and all additional defer durations comprised in FIG. 7.

In one embodiment, performing energy detection in a given time duration refers to performing energy detection in all slot durations within the given time duration; the given time duration any duration of all defer durations, all additional slot durations and all additional defer durations comprised in FIG. 7.

In one embodiment, the phrase that a given time duration is determined as idle through energy detection means that all slot durations within the given time duration are determined as idle through energy detection; the given time duration is any duration of all defer durations, all additional slot durations and all additional defer durations comprised in FIG. 7.

In one embodiment, the phrase that a given slot duration is determined as idle through energy detection means that the first node senses power of all radio signals in a given time unit on the first sub-band and averages in time, from which a received power acquired is lower than the first threshold; the given time unit is a consecutive time duration in the given slot duration.

In one subembodiment, the given time unit lasts no shorter than 4 μs.

In one embodiment, the phrase that a given slot duration is determined as idle through energy detection means that the first node senses energy of all radio signals in a given time unit on the first sub-band and averages in time, from which a received energy acquired is lower than the first threshold; the given time unit is a consecutive time duration in the given slot duration.

In one subembodiment, the given time unit lasts no shorter than 4 μs.

In one embodiment, the phrase that a given slot duration is determined as idle through energy detection means that the first node performs energy detection in a time sub-pool comprised by the given slot duration, from which a detection value obtained is lower than the first threshold; the time sub-pool belongs to the Q time sub-pool(s), and the detection value belongs to the Q detection value(s).

In one embodiment, performing energy detection in a given time duration refers to performing energy detection in each of time sub-pool(s) within the given time duration; the given time duration is any duration of all defer durations, all additional slot durations and all additional defer durations comprised in FIG. 7. Each of the time sub-pool(s) belongs to the Q time sub-pool(s).

In one embodiment, the phrase that a given time duration is determined as idle through energy detection means that each of detection value(s) obtained through energy detection in time sub-pool(s) comprised by the given time duration is lower than the first threshold; the given time duration is any duration of all defer durations, all additional slot durations and all additional defer durations comprised in FIG. 7. Each of the time sub-pool(s) belongs to the Q time sub-pool(s), and the detection value is one of the Q detection value(s).

In one embodiment, a defer duration lasts 16 μs plus M1 time(s) the length of 9 μs, M1 being a positive integer.

In one subembodiment, a defer duration comprises M1+1 time sub-pools of the Q time sub-pools.

In one reference embodiment of the above subembodiment, a first time sub-pool among the M1+1 time sub-pools lasts no longer than 16 μs, while each of the other M1 time sub-pool(s) lasts no longer than 9 μs.

In one subembodiment, a priority class corresponding to the third radio signal of the present disclosure is used to determine the M1.

In one reference embodiment of the above subembodiment, the priority class refers to Channel Access Priority Class, for the detailed definition of the Channel Access Priority Class, refer to 3GPP TS36.213, section 15.

In one subembodiment, the M1 is one of 1, 2, 3 and 7.

In one embodiment, a defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, an additional defer duration lasts 16 μs plus M2 time(s) the length of 9 μs, M2 being a positive integer.

In one subembodiment, an additional defer duration comprises M2+1 time sub-pools of the Q time sub-pools.

In one reference embodiment of the above subembodiment, a first time sub-pool among the M2+1 time sub-pools lasts no longer than 16 μs, while each of the other M2 time sub-pool(s) lasts no longer than 9 μs.

In one subembodiment, a priority class corresponding to the third radio signal of the present disclosure is used to determine the M2.

In one subembodiment, the M2 is one of 1, 2, 3 and 7.

In one embodiment, a defer duration lasts as long as an additional defer duration.

In one embodiment, the M1 is equal to the M2.

In one embodiment, an additional defer duration comprises multiple slot durations.

In one subembodiment, a first slot duration and a second slot duration among the multiple slot durations are non-consecutive.

In one subembodiment, a first slot duration and a second slot duration among the multiple slot durations are spaced by a time interval of 7 ms.

In one embodiment, a slot duration lasts 9 μs.

In one embodiment, a slot duration comprises one time sub-pool of the Q time sub-pool(s).

In one subembodiment, the one time sub-pool lasts no longer than 9 μs.

In one embodiment, an additional slot duration lasts 9 μs.

In one embodiment, an additional slot duration comprises one time sub-pool of the Q time sub-pool(s).

In one subembodiment, the one time sub-pool lasts no longer than 9 μs.

In one embodiment, the Q energy detection(s) is(are) used to determine whether the first sub-band is idle.

In one embodiment, the Q energy detection(s) is(are) used to determine whether the first sub-band can be used by the first node for transmitting a radio signal.

In one embodiment, each of the Q detection value(s) is measured by dBm.

In one embodiment, each of the Q detection value(s) is measured by mW.

In one embodiment, each of the Q detection value(s) is measured by J.

In one embodiment, the Q1 is less than the Q.

In one embodiment, the Q is greater than 1.

In one embodiment, the first threshold is measured by dBm.

In one embodiment, the first threshold is measured by mW.

In one embodiment, the first threshold is measured by J.

In one embodiment, the first threshold is equal to or less than −72 dBm.

In one embodiment, the first threshold is any value equal to or less than a first given value.

In one subembodiment, the first given value is pre-defined.

In one subembodiment, the first given value is configured by a higher-layer signaling, and the first node is a UE.

In one embodiment, the first threshold is liberally selected by the first node given that the first threshold is equal to or less than a first given value.

In one subembodiment, the first given value is pre-defined.

In one subembodiment, the first given value is configured by a higher-layer signaling, and the first node is a UE.

In one embodiment, the Q1 is one of the K candidate integers; the T1 first-type radio signal(s) is(are) used to determine K candidate integers, K being a positive integer.

In one embodiment, the Q1 is one of the K candidate integers; the S third-type radio signal(s) and the T1 first-type radio signal(s) are jointly used to determine K candidate integers, K being a positive integer.

In one subembodiment, the K belongs to a collection of 3, 7, 15, 31, 63, 127, 255, 511, and 1023.

In one embodiment, the Q energy detection(s) is(are) energy detection(s) in a process of Cat4 LBT, the Q1 is CWp in Cat4 LBT, the CWp is contention window size, and the detailed definition of the CWp can be found in 3GPP TS36.213, section 15.

In one embodiment, among detection value(s) of the Q detection values not belonging to the Q1 detection value(s) at least one detection value is lower than the first threshold.

In one embodiment, among detection value(s) of the Q detection values not belonging to the Q1 detection value(s) at least one detection value is not lower than the first threshold.

In one embodiment, any two of the Q1 time sub-pools are of an equal duration.

In one embodiment, at least two of the Q1 time sub-pools are of unequal durations.

In one embodiment, the Q1 time sub-pool(s) comprises (comprise) a latest time sub-pool of the Q time sub-pools.

In one embodiment, the Q1 time sub-pool(s) only comprises(comprise) slot durations in an eCCA.

In one embodiment, the Q time sub-pools comprise the Q1 time sub-pool(s) and Q2 time sub-pool(s), wherein any of the Q2 time sub-pool(s) does not belong to the Q1 time sub-pool(s); Q2 is a positive integer no greater than a difference between the Q and the Q1.

In one subembodiment, the Q2 time sub-pool(s) comprises(comprise) slot durations in an initial CCA.

In one subembodiment, positions of the Q2 time sub-pools are consecutive among the Q time sub-pools.

In one subembodiment, at least one of the Q2 time sub-pool(s) corresponds to the first threshold lower than the first threshold.

In one subembodiment, at least one of the Q2 time sub-pool(s) corresponds to the first threshold no lower than the first threshold.

In one subembodiment, the Q2 time sub-pool(s) comprises(comprise) slot durations within all defer duration(s).

In one subembodiment, the Q2 time sub-pool(s) comprises(comprise) slot durations within at least one additional defer duration.

In one subembodiment, the Q2 time sub-pool(s) comprises(comprise) at least one additional slot duration.

In one subembodiment, the Q2 time sub-pool(s) comprises(comprise) all slot durations within all additional slot duration(s) and additional defer duration(s) determined as non-idle through energy detection in FIG. 7.

In one embodiment, the Q1 time sub-pool(s) respectively belongs(belong) to Q1 sub-pool set(s), any of the Q1 sub-pool set(s) comprises a positive integer number of time sub-pool(s) among the Q time sub-pool(s); any of the Q1 sub-pool set(s) corresponds to a detection value lower than the first threshold.

In one subembodiment, there is at least one sub-pool set among the Q1 sub-pool set(s) that comprises one time sub-pool.

In one subembodiment, there is at least one sub-pool set among the Q1 sub-pool set(s) that comprises more than one time sub-pool.

In one subembodiment, among the Q1 sub-pool sets there are at least two sub-pool sets comprising unequal numbers of time sub-pools.

In one subembodiment, none of the Q time sub-pools belongs to two of the Q1 sub-pool sets simultaneously.

In one subembodiment, all time sub-pools in any of the Q1 sub-pool set(s) belong to a same additional defer duration or a same additional slot duration determined to be idle through energy detection.

In one subembodiment, among time sub-pool(s) of the Q time sub-pools not belonging to the Q1 sub-pool set(s) there is at least one time sub-pool corresponding to a detection value lower than the first threshold.

In one subembodiment, among time sub-pool(s) of the Q time sub-pools not belonging to the Q1 sub-pool set(s) there is at least one time sub-pool corresponding to a detection value no lower than the first threshold.

Embodiment 8

Figure 8:
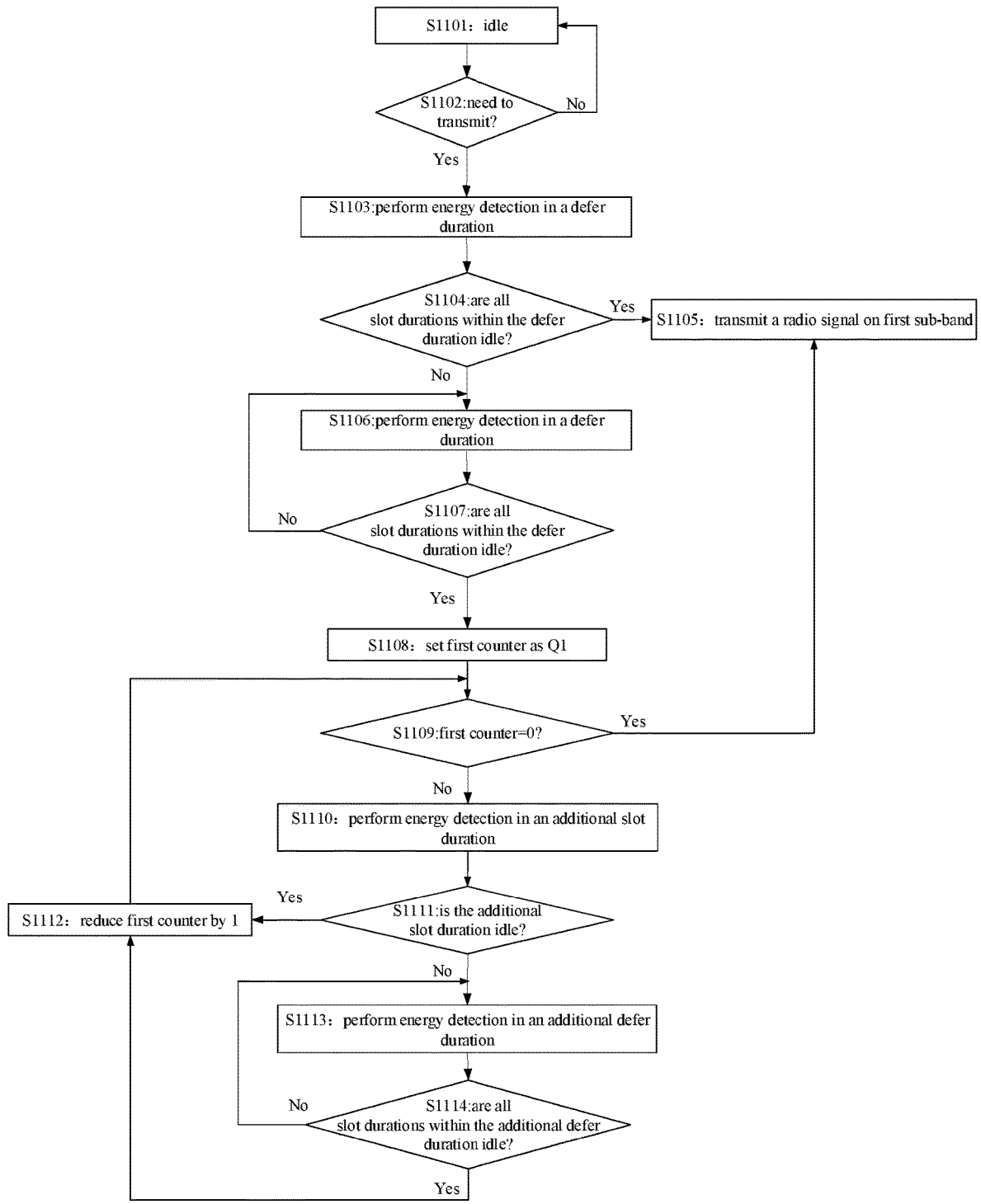
FIG. 8 illustrates a schematic diagram of a process of performing Q energy detection(s) respectively in Q time sub-pool(s) according to another embodiment of the present disclosure.

Embodiment 8 illustrates a schematic diagram of a process of performing Q energy detection(s) respectively in Q time sub-pool(s); as shown in FIG. 8.

In Embodiment 8, the first node of the present disclosure performs Q energy detection(s) respectively in Q time sub-pool(s) on a first sub-band of the present disclosure to obtain Q detection value(s). Each of Q1 detection value(s) among the Q detection value(s) is lower than a first threshold, and Q1 is a positive integer no greater than the Q. Q1 time sub-pool(s) is(are) time sub-pool(s) of the Q time sub-pool(s) respectively corresponding to the Q1 detection value(s). The process of the Q energy detection(s) can be depicted by the flowchart in FIG. 8.

In Embodiment 8, the first node is idle in step S1101; and determines in step S1102 whether there is need to transmit; performs energy detection in a defer duration in step S1103; and determines in step S1104 whether all slot durations within the defer duration are idle, if yes, move forward to step S1105 to transmit a radio signal on the first sub-band of the present disclosure; otherwise move forward to step S1106 to perform energy detection in a defer duration; the first node determines in step S1107 whether all slot durations within the defer duration are idle, if yes, move forward to step S1108 to set a first counter as Q1; otherwise go back to step S1106; the first node determines whether the first counter is 0 in step S1109, if yes, move back to step S1105 to transmit a radio signal on the first sub-band; otherwise move forward to step S1110 to perform energy detection in an additional slot duration; the first node determines in step S1111 whether the additional slot duration is idle, if yes, move forward to step S1112 to reduce the first counter by 1 and then go back to step S1109; otherwise move forward to step S1113 to perform energy detection in an additional defer duration; the first node determines in step S1114 whether all slot durations within the additional defer duration are idle, if yes, move back to step S1112; otherwise go back to step S1113.

In Embodiment 8, a first given duration comprises a positive integer number of time sub-pool(s) of the Q time sub-pool(s), and the first given duration is any duration of all defer durations, all additional slot durations and all additional defer durations comprised in FIG. 8. A second given duration comprises one of the Q1 time sub-pool(s), and the second given duration is any duration of all additional slot durations and all additional defer durations determined to be idle through energy detection in FIG. 8.

In one embodiment, the Q1 is equal to 0, and the first node determines in the step S1104 that all slot durations within the defer duration are idle.

In one embodiment, the Q1 is one of the K candidate integers of the present disclosure, K being a positive integer, and the first node determines in the step S1104 that not all slot durations within the defer duration are idle.

Embodiment 9

Figure 9:
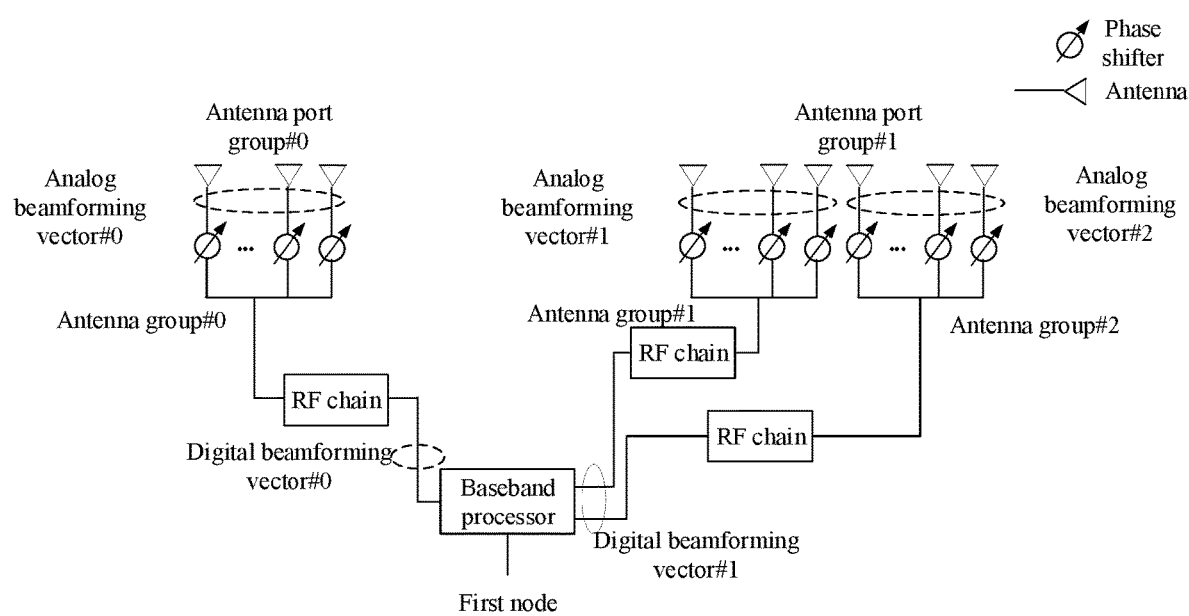
FIG. 9 illustrates a schematic diagram of antenna ports and antenna port groups according to one embodiment of the present disclosure.
Figure 10A:
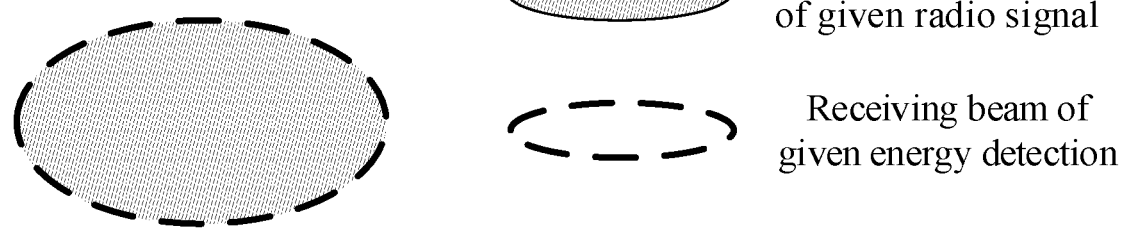
FIG. 10A-FIG. 10B respectively illustrate a schematic diagram of a given radio signal being spatially correlated to a given energy detection according to one embodiment of the present disclosure.
Figure 10B:
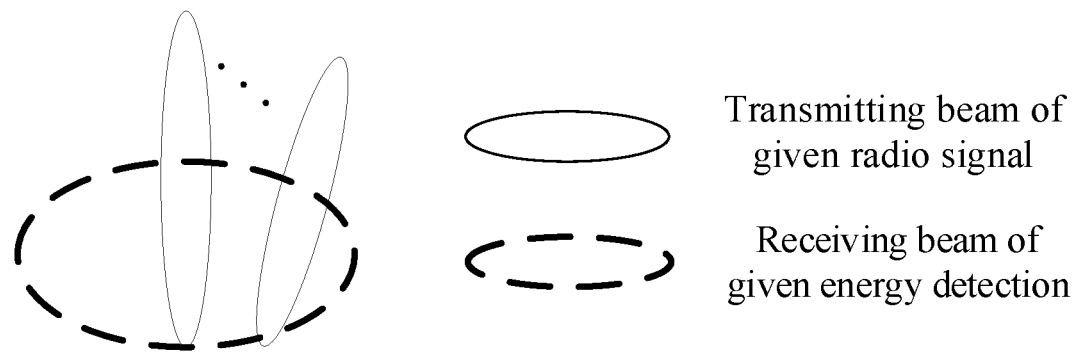
Figure 11A:
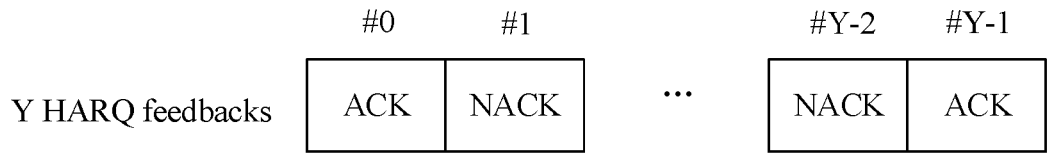
FIG. 11A-FIG. 11D respectively illustrate a schematic diagram of relations of X given first radio signals, X given second radio signals and Q according to one embodiment of the present disclosure.
Figure 11B:
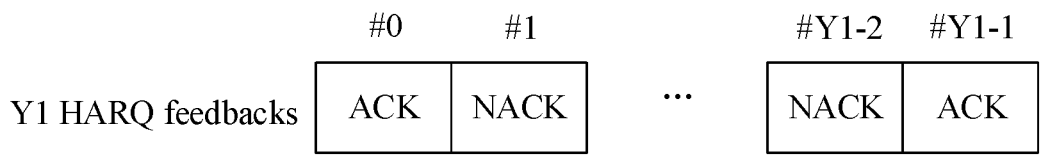
Figure 11C:
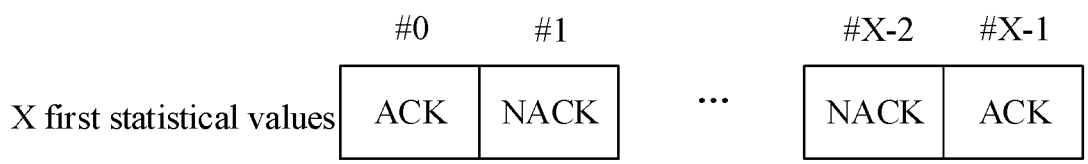
Figure 11D:
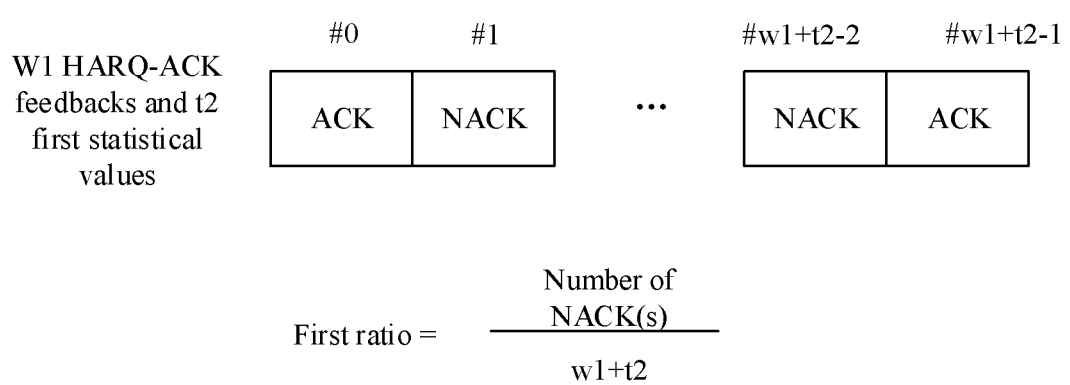

Embodiment 9 illustrates a schematic diagram of antenna ports and antenna port groups, as shown in FIG. 9.

In Embodiment 9, an antenna port group comprises a positive integer number of antenna port(s); an antenna port is formed by superimposing antennas in a positive integer number of antenna group(s) through antenna virtualization; an antenna group comprises a positive integer number of antenna(s). An antenna group is connected to a baseband processor via a Radio Frequency (RF) chain, so different antenna groups correspond to different RF chains. Mapping coefficients of all antennas in a positive integer number of antenna group(s) comprised by a given antenna port to the given antenna port constitute a beamforming vector corresponding to the given antenna port. Mapping coefficients of multiple antennas in any given antenna group among a positive integer number of antenna group(s) comprised by the given antenna port to the given antenna port constitute an analog beamforming vector of the given antenna group. Analog beamforming vector(s) respectively corresponding to the positive integer number of antenna group(s) comprised by the given antenna port is(are) diagonally arranged to form an analog beamforming matrix corresponding to the given antenna port. Mapping coefficient(s) of the positive integer number of antenna group(s) comprised by the given antenna port to the given antenna port constitutes(constitute) a digital beamforming vector corresponding to the given antenna port. A beamforming vector corresponding to the given antenna port is a product of an analog beamforming matrix corresponding to the given antenna port and a digital beamforming vector corresponding to the given antenna port. Each of antenna ports in an antenna port group is composed of (a) same antenna group(s), while different antenna ports in a same antenna port group correspond to different beamforming vectors.

Two antenna port groups are presented in FIG. 9, which are antenna port group #0 and antenna port group #1. Herein, the antenna port group #0 is composed of antenna group #0, while the antenna port group #1 is composed of antenna group #1 and antenna group #2. Mapping coefficients of multiple antennas in the antenna group #0 to the antenna port group #0 constitute an analog beamforming vector #0, while a mapping coefficient of the antenna group #0 to the antenna port group #0 constitutes a digital beamforming vector #0. Mapping coefficients of multiple antennas in the antenna group #1 and of multiple antennas in the antenna group #2 to the antenna port group #1 respectively constitute an analog beamforming vector #1 and an analog beamforming vector #2; and mapping coefficients of the antenna group #1 and of the antenna group #2 to the antenna port group #1 constitute a digital beamforming vector #1. A beamforming vector corresponding to any antenna port in the antenna port group #0 is a product of the analog beamforming vector #0 and the digital beamforming vector #0. A beamforming vector corresponding to any antenna port in the antenna port group #1 is a product of the digital beamforming vector #1 and an analog beamforming matrix formed by diagonally arranging of the analog beamforming vector #1 and the analog beamforming vector #2.

In one embodiment, an antenna port group comprises one antenna port, for instance, the antenna port group #0 in FIG. 9 comprises an antenna port.

In one subembodiment, an analog beamforming matrix corresponding to the antenna port is dimensionally reduced to an analog beamforming vector, and a digital beamforming vector corresponding to the antenna port is dimensionally reduced to a scaler, and a beamforming vector corresponding to the antenna port is equivalent to an analog beamforming vector corresponding to the antenna port. For example, the digital beamforming vector #0 in FIG. 9 is dimensionally reduced to a scaler, and a beamforming vector corresponding to an antenna port in the antenna port group #0 is the analog beamforming vector #0.

In one embodiment, an antenna port group comprises multiple antenna ports, for example, the antenna port group #1 in FIG. 9 comprises multiple antenna ports.

In one subembodiment, the multiple antenna ports correspond to a same analog beamforming matrix.

In one subembodiment, among the multiple antenna ports at least two antenna ports correspond to a same analog beamforming matrix.

In one subembodiment, among the multiple antenna ports at least two antenna ports correspond to different analog beamforming matrixes.

In one subembodiment, the multiple antenna ports correspond to different digital beamforming vectors.

In one subembodiment, among the multiple antenna ports at least two antenna ports correspond to a same digital beamforming vector.

In one subembodiment, among the multiple antenna ports at least two antenna ports correspond to different digital beamforming vectors.

In one embodiment, any two antenna ports respectively comprised in different antenna port groups correspond to different analog beamforming matrixes.

In one embodiment, at least two antenna ports respectively comprised in different antenna port groups correspond to different analog beamforming matrixes.

In one embodiment, at least two antenna ports respectively comprised in different antenna port groups correspond to a same analog beamforming matrix.

In one embodiment, two different antenna port groups are Quasi Co-Located (QCL).

In one embodiment, two different antenna port groups are not QCL.

In one embodiment, any two antenna ports in an antenna port group are QCL.

In one embodiment, any two antenna ports in an antenna port group are non-QCL.

In one embodiment, at least two antenna ports in an antenna port group are QCL.

In one embodiment, at least two antenna ports in an antenna port group are non-QCL.

In one embodiment, any two antenna ports in an antenna port group are spatial QCL.

In one embodiment, any two antenna ports in an antenna port group are not spatial QCL.

In one embodiment, at least two antenna ports in an antenna port group are spatial QCL.

In one embodiment, at least two antenna ports in an antenna port group are not spatial QCL.

In one embodiment, the phrase that two antenna ports are QCL means that all or part of large-scale properties of a radio signal transmitted from one of the two antenna ports can be used to infer all or part of large-scale properties of a radio signal transmitted from the other of the two antenna ports.

In one embodiment, the phrase that two antenna ports are QCL means that the two antenna ports share at least one same QCL parameter, wherein the QCL parameter comprises multi-antenna-related QCL parameters and multi-antenna-unrelated QCL parameters.

In one embodiment, the phrase that two antenna ports are QCL means that at least one QCL parameter of one of the two antenna ports can be used to infer at least one QCL parameter of the other of the two antenna ports.

In one embodiment, the phrase that two antenna ports are QCL means that multi-antenna-related reception of a radio signal transmitted from one of the two antenna ports can be used to infer multi-antenna-related reception of a radio signal transmitted from the other of the two antenna ports.

In one embodiment, the phrase that two antenna ports are QCL means that multi-antenna-related transmission of a radio signal transmitted from one of the two antenna ports can be used to infer multi-antenna-related transmission of a radio signal transmitted from the other of the two antenna ports.

In one embodiment, the phrase that two antenna ports are QCL means that multi-antenna-related reception of a radio signal transmitted from one of the two antenna ports can be used to infer multi-antenna-related transmission of a radio signal transmitted from the other of the two antenna ports; a receiver of the radio signal transmitted from the one of the two antenna ports is the same as a transmitter of the radio signal transmitted from the other of the two antenna ports.

In one embodiment, the phrase that two antenna ports are non-QCL means that all or part of large-scale properties of a radio signal transmitted from one of the two antenna ports cannot be used to infer all or part of large-scale properties of a radio signal transmitted from the other of the two antenna ports.

In one embodiment, the phrase that two antenna ports are non-QCL means that any of the two antenna ports at least has one QCL parameter different from the other of the two antenna ports, wherein the QCL parameter comprises multi-antenna-related QCL parameters and multi-antenna-unrelated QCL parameters.

In one embodiment, the phrase that two antenna ports are non-QCL means that at least one QCL parameter of one of the two antenna ports cannot be used to infer at least one QCL parameter of the other of the two antenna ports.

In one embodiment, the phrase that two antenna ports are non-QCL means that multi-antenna-related reception of a radio signal transmitted from one of the two antenna ports cannot be used to infer multi-antenna-related reception of a radio signal transmitted from the other of the two antenna ports.

In one embodiment, the phrase that two antenna ports are non-QCL means that multi-antenna-related transmission of a radio signal transmitted from one of the two antenna ports cannot be used to infer multi-antenna-related transmission of a radio signal transmitted from the other of the two antenna ports.

In one embodiment, the phrase that two antenna ports are non-QCL means that multi-antenna-related reception of a radio signal transmitted from one of the two antenna ports cannot be used to infer multi-antenna-related transmission of a radio signal transmitted from the other of the two antenna ports; a receiver of the radio signal transmitted from the one of the two antenna ports is the same as a transmitter of the radio signal transmitted from the other of the two antenna ports.

In one embodiment, multi-antenna-related QCL parameters comprise one or more of angle of arrival, angle of departure, spatial correlation, multi-antenna-related transmission or multi-antenna-related reception.

In one embodiment, multi-antenna-unrelated QCL parameters comprise one or more of delay spread, Doppler spread, Doppler shift, pathloss or average gain.

In one embodiment, the phrase that two antenna ports are spatial QCL means that all or part of multi-antenna-related large-scale properties of a radio signal transmitted from one of the two antenna ports can be used to infer all or part of multi-antenna-related large-scale properties of a radio signal transmitted from the other of the two antenna ports.

In one embodiment, the phrase that two antenna ports are spatial QCL means that the two antenna ports share at least a same multi-antenna-related QCL parameter (spatial QCL parameter).

In one embodiment, the phrase that two antenna ports are spatial QCL means that at least one multi-antenna-related QCL parameter of one of the two antenna ports can be used to infer at least one multi-antenna-related QCL parameter of the other of the two antenna ports.

In one embodiment, the phrase that two antenna ports are spatial QCL means that multi-antenna-related reception of a radio signal transmitted from one of the two antenna ports can be used to infer multi-antenna-related reception of a radio signal transmitted from the other of the two antenna ports.

In one embodiment, the phrase that two antenna ports are spatial QCL means that multi-antenna-related transmission of a radio signal transmitted from one of the two antenna ports can be used to infer multi-antenna-related transmission of a radio signal transmitted from the other of the two antenna ports.

In one embodiment, the phrase that two antenna ports are spatial QCL means that multi-antenna-related reception of a radio signal transmitted from one of the two antenna ports can be used to infer multi-antenna-related transmission of a radio signal transmitted from the other of the two antenna ports; a receiver of the radio signal transmitted from the one of the two antenna ports is the same as a transmitter of the radio signal transmitted from the other of the two antenna ports.

In one embodiment, the phrase that two antenna ports are not spatial QCL means that all or part of multi-antenna-related large-scale properties of a radio signal transmitted from one of the two antenna ports cannot be used to infer all or part of multi-antenna-related large-scale properties of a radio signal transmitted from the other of the two antenna ports.

In one embodiment, the phrase that two antenna ports are not spatial QCL means that any of the two antenna ports at least has one multi-antenna related QCL parameter (spatial QCL parameter) different from the other of the two antenna ports.

In one embodiment, the phrase that two antenna ports are not spatial QCL means that at least one multi-antenna-related QCL parameter of one of the two antenna ports cannot be used to infer at least one multi-antenna-related QCL parameter of the other of the two antenna ports.

In one embodiment, the phrase that two antenna ports are not spatial QCL means that multi-antenna-related reception of a radio signal transmitted from one of the two antenna ports cannot be used to infer multi-antenna-related reception of a radio signal transmitted from the other of the two antenna ports.

In one embodiment, the phrase that two antenna ports are not spatial QCL means that multi-antenna-related transmission of a radio signal transmitted from one of the two antenna ports cannot be used to infer multi-antenna-related transmission of a radio signal transmitted from the other of the two antenna ports.

In one embodiment, the phrase that two antenna ports are not spatial QCL means that multi-antenna-related reception of a radio signal transmitted from one of the two antenna ports cannot be used to infer multi-antenna-related transmission of a radio signal transmitted from the other of the two antenna ports; a receiver of the radio signal transmitted from the one of the two antenna ports is the same as a transmitter of the radio signal transmitted from the other of the two antenna ports.

In one embodiment, multi-antenna-related large-scale properties of a given radio signal comprise one or more of angle of arrival, angle of departure, spatial correlation, multi-antenna-related transmission or multi-antenna-related reception.

Embodiment 10

Embodiment 10A-10B illustrates a schematic diagram of a given radio signal being spatially correlated to a given energy detection.

In Embodiment 10, the given energy detection corresponds to any of the Q energy detection(s) of the present disclosure, and the given radio signal corresponds to any sub-signal spatially correlated to the Q energy detection(s) among sub-signal(s) comprised by any of the T1 second-type radio signal(s) of the present disclosure; or, the given radio signal corresponds to any sub-signal spatially correlated to the Q energy detection(s) among sub-signal(s) comprised by any of the S fourth-type radio signal(s) of the present disclosure; or, the given radio signal corresponds to the fifth radio signal of the present disclosure.

In one embodiment, the phrase that a given radio signal is spatially correlated to a given energy detection means that multi-antenna related reception employed by the given energy detection can be used to infer multi-antenna transmission of the given radio signal, or multi-antenna transmission of the given radio signal can be used to infer multi-antenna related reception employed by the given energy detection.

In one embodiment, the phrase that a given radio signal is spatially correlated to a given energy detection means that multi-antenna related reception employed by the given energy detection is the same as multi-antenna related transmission of the given radio signal.

In one embodiment, the phrase that a given radio signal is spatially correlated to a given energy detection means that multi-antenna related reception employed by the given energy detection comprises multi-antenna related transmission of the given radio signal.

In one embodiment, the phrase that a given radio signal is spatially correlated to a given energy detection means that a beam width corresponding to a reception beamforming matrix employed by the given energy detection is no smaller than a beam width corresponding to a transmission beamforming matrix of the given radio signal.

In one embodiment, the phrase that a given radio signal is spatially correlated to a given energy detection means that a beam direction corresponding to a reception beamforming matrix employed by the given energy detection comprises a beam direction corresponding to a transmission beamforming matrix of the given radio signal.

In one embodiment, the phrase that a given radio signal is spatially correlated to a given energy detection means that a beam width corresponding to a receiving beam employed by the given energy detection is larger than a beam width corresponding to a transmitting beam of the given radio signal.

In one embodiment, the phrase that a given radio signal is spatially correlated to a given energy detection means that a receiving beam employed by the given energy detection comprises a transmitting beam of the given radio signal.

In one embodiment, the phrase that a given radio signal is not spatially correlated to a given energy detection means that multi-antenna related reception employed by the given energy detection cannot be used to infer multi-antenna transmission of the given radio signal, or multi-antenna transmission of the given radio signal cannot be used to infer multi-antenna related reception employed by the given energy detection.

In one embodiment, the phrase that a given radio signal is not spatially correlated to a given energy detection means that multi-antenna related reception employed by the given energy detection is different from multi-antenna related transmission of the given radio signal.

In one embodiment, the phrase that a given radio signal is not spatially correlated to a given energy detection means that multi-antenna related reception employed by the given energy detection does not comprise multi-antenna related transmission of the given radio signal.

In one embodiment, the phrase that a given radio signal is not spatially correlated to a given energy detection means that a beam width corresponding to a reception beamforming matrix employed by the given energy detection is smaller than a beam width corresponding to a transmission beamforming matrix of the given radio signal.

In one embodiment, the phrase that a given radio signal is not spatially correlated to a given energy detection means that a beam direction corresponding to a reception beamforming matrix employed by the given energy detection does not comprise a beam direction corresponding to a transmission beamforming matrix of the given radio signal.

In one embodiment, the phrase that a given radio signal is not spatially correlated to a given energy detection means that a beam width corresponding to a receiving beam employed by the given energy detection is smaller than a beam width corresponding to a transmitting beam of the given radio signal.

In one embodiment, the phrase that a given radio signal is not spatially correlated to a given energy detection means that a receiving beam employed by the given energy detection does not comprise a transmitting beam of the given radio signal.

In one embodiment, the multi-antenna related reception refers to Spatial Rx parameters.

In one embodiment, the multi-antenna related reception refers to a receiving beam.

In one embodiment, the multi-antenna related reception refers to a reception beamforming matrix.

In one embodiment, the multi-antenna related reception refers to a reception analog beamforming matrix.

In one embodiment, the multi-antenna related reception refers to a reception analog beamforming vector.

In one embodiment, the multi-antenna related reception refers to a reception beamforming vector.

In one embodiment, the multi-antenna related reception refers to reception spatial filtering.

In one embodiment, the multi-antenna related transmission refers to Spatial Tx parameters.

In one embodiment, the multi-antenna related transmission refers to a transmitting beam.

In one embodiment, the multi-antenna related transmission refers to a transmission beamforming matrix.

In one embodiment, the multi-antenna related transmission refers to a transmission analog beamforming matrix.

In one embodiment, the multi-antenna related transmission refers to a transmission analog beamforming vector.

In one embodiment, the multi-antenna related transmission refers to a transmission beamforming vector.

In one embodiment, the multi-antenna related transmission refers to a transmission spatial filtering.

In one embodiment, the Spatial Tx parameters comprise one or more of a transmission antenna port, a transmission antenna port group, a transmitting beam, a transmission analog beamforming matrix, a transmission analog beamforming vector, a transmission beamforming matrix, a transmission beamforming vector or transmission spatial filtering.

In one embodiment, the Spatial Tx parameters comprise a transmission antenna port.

In one embodiment, the Spatial Tx parameters comprise a transmission antenna port group.

In one embodiment, the Spatial Tx parameters comprise a transmitting beam.

In one embodiment, the Spatial Tx parameters comprise a transmission analog beamforming matrix.

In one embodiment, the Spatial Tx parameters comprise a transmission analog beamforming vector.

In one embodiment, the Spatial Tx parameters comprise a transmission beamforming matrix.

In one embodiment, the Spatial Tx parameters comprise a transmission beamforming vector.

In one embodiment, the Spatial Tx parameters comprise a transmission antenna port and a transmitting beam.

In one embodiment, the Spatial Tx parameters comprise a transmission antenna port and a transmission analog beamforming matrix.

In one embodiment, the Spatial Tx parameters comprise a transmission antenna port and a transmission analog beamforming vector.

In one embodiment, the Spatial Tx parameters comprise a transmission antenna port and a transmission beamforming matrix.

In one embodiment, the Spatial Tx parameters comprise a transmission antenna port and a transmission beamforming vector.

In one embodiment, the Spatial Tx parameters comprise a transmission antenna port group and a transmitting beam.

In one embodiment, the Spatial Tx parameters comprise a transmission antenna port group and a transmission analog beamforming matrix.

In one embodiment, the Spatial Tx parameters comprise a transmission antenna port group and a transmission analog beamforming vector.

In one embodiment, the Spatial Tx parameters comprise a transmission antenna port group and a transmission beamforming matrix.

In one embodiment, the Spatial Tx parameters comprise a transmission antenna port group and a transmission beamforming vector.

In one embodiment, the Spatial Rx parameters comprise one or more of a receiving beam, a reception analog beamforming matrix, a reception analog beamforming vector, a reception beamforming matrix, a reception beamforming vector or reception spatial filtering.

In one embodiment, the Spatial Rx parameters comprise a receiving beam.

In one embodiment, the Spatial Rx parameters comprise a reception analog beamforming matrix.

In one embodiment, the Spatial Rx parameters comprise a reception analog beamforming vector.

In one embodiment, the Spatial Rx parameters comprise a reception beamforming matrix.

In one embodiment, the Spatial Rx parameters comprise a reception beamforming vector.

In one embodiment, the Spatial Rx parameters comprise reception spatial filtering.

In one embodiment, a number of antennas employed in the given energy detection is less than a number of transmission antennas of the given radio signal.

In one embodiment, a number of antennas employed in the given energy detection is greater than 1.

In one embodiment, a number of transmission antennas of the given radio signal is greater than 1.

In one embodiment, the Embodiment 10A corresponds to a schematic diagram of a given radio signal being spatially correlated to a given energy detection, wherein a receiving beam employed by the given energy detection is the same as a transmission beam of the given radio signal.

In one embodiment, the Embodiment 10B corresponds to a schematic diagram of a given radio signal being spatially correlated to a given energy detection, wherein a receiving beam employed by the given energy detection comprises a transmission beam of the given radio signal.

Embodiment 11

Embodiment 11A-11D respectively illustrate a schematic diagram of relations of X given first radio signals, X given second radio signals and Q.

In Embodiment 11, the first node of the present disclosure is a base station, the X given first radio signals respectively indicate whether the X given second radio signals are correctly received; the X given second radio signals comprise Y sub-signals, and the X given first radio signals indicate whether any of the Y sub-signals is correctly received, Y being a positive integer no less than X; among sub-signal(s) of the Y sub-signals belonging to a same given second radio signal of the X given second radio signals, there is at least one sub-signal being spatially correlated to the Q energy detection(s) of the present disclosure; whether the Y sub-signals are correctly received is used to determine the Q. The X given first radio signals correspond to the T1 first-type radio signals of the present disclosure, the X given second radio signals correspond to the T1 second-type radio signals of the present disclosure, and the Y sub-signals correspond to the W sub-signals of the present disclosure; or, the X given first radio signals correspond to the S third-type radio signal(s) and the T1 first-type radio signal(s) of the present disclosure, the X given second radio signals correspond to the S fourth-type radio signal(s) and the T1 second-type radio signal(s) of the present disclosure, and the Y sub-signals correspond to the S1 sub-signal(s) and the W sub-signal(s) of the present disclosure.

In one embodiment, the Y is greater than the X.

In one embodiment, among sub-signal(s) comprised by one of the X given second radio signals there is at least one sub-signal not being spatially correlated to the Q energy detection(s).

In one embodiment, among sub-signal(s) comprised by any of the X given second radio signals there is at least one sub-signal being spatially correlated to the Q energy detection(s).

In one embodiment, among the X given second radio signals there is at least one given second radio signal that comprises multiple sub-signals.

In one embodiment, any given second radio signal of the X given second radio signals comprises multiple sub-signals.

In one embodiment, a first reference radio signal comprises Y2 sub-signal(s), the first reference radio signal is any given second radio signal of the X given second radio signals, and each of the Y2 sub-signal(s) belongs to the Y sub-signals.

In one subembodiment of the above embodiment, the Y2 is greater than 1, the Y2 sub-signals occupy the same time-domain resources.

In one subembodiment of the above embodiment, the Y2 is greater than 1, at least one multicarrier symbol is occupied by each of the Y2 sub-signals.

In one subembodiment of the above embodiment, the Y2 is greater than 1, the Y2 sub-signals occupy the same frequency-domain resources.

In one subembodiment of the above embodiment, the Y2 is greater than 1, at least one subcarrier is occupied by each of the Y2 sub-signals.

In one subembodiment of the above embodiment, the Y2 is greater than 1, respective multi-antenna related transmissions of the Y2 sub-signals are different from each other.

In one subembodiment of the above embodiment, the Y2 is greater than 1, respective multi-antenna related transmissions of the Y2 sub-signals are the same.

In one subembodiment of the above embodiment, the Y2 is a positive integer no greater than 2.

In one subembodiment of the above embodiment, the Y2 is equal to 1.

In one subembodiment of the above embodiment, the Y2 is equal to 2.

In one subembodiment of the above embodiment, the Y2 is equal to a number of codewords of the first reference radio signal.

In one subembodiment of the above embodiment, the first reference radio signal comprises Y2 codeword(s), the Y2 sub-signal(s) respectively corresponding to the Y2 codeword(s).

In one subembodiment of the above embodiment, the Y2 is greater than 1, the Y2 sub-signals respectively occupy different antenna ports or different antenna port groups.

In one subembodiment of the above embodiment, one of the X given first radio signals that corresponds to the first reference radio signal comprises Y2 first sub-signal(s), and the Y2 first sub-signal(s) is(are) respectively used to determine whether the Y2 sub-signal(s) is(are) correctly received.

In one embodiment, a first ratio is equal to a ratio of a number of sub-signal(s) among the Y sub-signals not having been correctly received to the Y, the first ratio is used to determine the Q.

In one embodiment, the Embodiment 11A corresponds to a schematic diagram of relations of X given first radio signals, X given second radio signals and Q, wherein the X given first radio signals comprise a total of Y HARQ-ACK feedbacks, the Y HARQ-ACK feedbacks respectively corresponding to the Y sub-signals, and a value of any of the Y HARQ-ACK feedbacks is either ACKnowledgement (ACK) or Negative ACKnowledgement (NACK), and a first ratio is equal to a ratio of a number of NACK(s) comprised in the Y HARQ-ACK feedbacks to the Y.

In one embodiment, the Y is greater than the X, Y1 sub-signal(s) is(are) all sub-signal(s) spatially correlated to the Q energy detection(s) among the Y sub-signals, Y1 being a positive integer less than the Y; among the Y sub-signals only information of whether the Y1 sub-signal(s) is(are) correctly received is used to determine the Q.

In one embodiment, the Y is greater than the X, Y1 sub-signal(s) is(are) all sub-signal(s) spatially correlated to the Q energy detection(s) among the Y sub-signals, Y1 being a positive integer less than the Y; a first ratio is equal to a ratio of a number of sub-signal(s) of the Y1 sub-signal(s) not having been correctly received to the Y1, the first ratio being used to determine the Q.

In one embodiment, the Embodiment 11B corresponds to a schematic diagram of relations of X given first radio signals, X given second radio signals and Q, wherein the X given first radio signals comprise a total of Y HARQ-ACK feedbacks, the Y HARQ-ACK feedbacks respectively corresponding to the Y sub-signals, and a value of any of the Y HARQ-ACK feedbacks is either ACK or NACK; Y1 HARQ-ACK feedback(s) is(are) HARQ-ACK feedback(s) of the Y HARQ-ACK feedbacks respectively corresponding to the Y1 sub-signal(s); and a first ratio is equal to a ratio of a number of NACK(s) comprised in the Y1 HARQ-ACK feedback(s) to the Y1.

In one embodiment, the Y is greater than the X, whether the Y sub-signals are correctly received is used to determine X first statistical values, and the X first statistical values respectively indicate whether the X given second radio signals are counted as being correctly received, the X first statistical values being used to determine the Q.

In one subembodiment, a first reference radio signal is any given second radio signal of the X given second radio signals, among sub-signal(s) of the Y sub-signals belonging to the first reference radio signal at least one sub-signal is not spatially correlated to the Q energy detection(s).

In one subembodiment, a first reference radio signal is any given second radio signal of the X given second radio signals, each of sub-signal(s) comprised by the first reference radio signal among the Y sub-signals is correctly received, the first reference radio signal being counted as being correctly received.

In one subembodiment, a first reference radio signal is any given second radio signal of the X given second radio signals, at least one of sub-signal(s) comprised by the first reference radio signal among the Y sub-signals is not correctly received, the first reference radio signal being counted as not being correctly received.

In one embodiment, whether the Y sub-signals are correctly received is used to determine X first statistical values, the X first statistical values respectively indicate whether the X given second radio signals are counted as being correctly received, and a first ratio is equal to a ratio of a number of given second radio signal(s) counted as not having been correctly received among the X given second radio signals indicated by the X first statistical values to the X, the first ratio being used to determine the Q.

In one embodiment, the Embodiment 11C corresponds to a schematic diagram of relations of X given first radio signals, X given second radio signals and Q, wherein the X given first radio signals comprise a total of Y HARQ-ACK feedbacks, the Y HARQ-ACK feedbacks respectively corresponding to the Y sub-signals, and a value of any of the Y HARQ-ACK feedbacks is either ACK or NACK; the Y HARQ-ACK feedbacks are used to determine X first statistical values, of which each first statistical value is one of ACK or NACK; and a first ratio is equal to a ratio of a number of NACK(s) comprised in the X first statistical values to the X.

In one embodiment, the Y is greater than the X, the X given second radio signals are composed by t1 given second radio signals and t2 given second radio signals, wherein each sub-signal comprised by any of the t1 given second radio signals is spatially correlated to the Q energy detection(s), and at least one sub-signal comprised by any of the t2 given second radio signals is not spatially correlated to the Q energy detection(s), t1 being a positive integer greater than 1 and less than the X, and t2 being a positive integer greater than 1 and less than X, X being a sum of t1 and t2. The t1 given second radio signals comprise w1 sub-signals, and the t2 given second radio signals comprise w2 sub-signals, the Y sub-signals being composed by the w1 sub-signals and the w2 sub-signals; whether the w2 sub-signals are correctly received is used to determine t2 first statistical values, the t2 first statistical values respectively indicate whether the t2 given second radio signals are counted as being correctly received, and the t2 first statistical values and whether the w1 sub-signals are correctly received are used to determine the Q.

In one subembodiment, a first reference radio signal is any given second radio signal of the t2 given second radio signals, each of sub-signal(s) comprised by the first reference radio signal among the w2 sub-signals is correctly received, and the first reference radio signal is counted as being correctly received.

In one subembodiment, a first reference radio signal is any given second radio signal of the t2 given second radio signals, at least one of sub-signal(s) comprised by the first reference radio signal among the w2 sub-signals is not correctly received, and the first reference radio signal is counted as not being correctly received.

In one embodiment, a first reference value is equal to a sum of a number of sub-signal(s) not being correctly received among the w1 sub-signals and a number of given second radio signal(s) counted as not being correctly received among the t2 given second radio signals indicated by the t2 first statistical values, while a second reference value is equal to a sum of the w1 and the t2, a first ratio is a ratio of the first reference value to the second reference value, and the first ratio is used to determine the Q.

In one embodiment, the Embodiment 11D corresponds to a schematic diagram of relations of X given first radio signals, X given second radio signals and Q, wherein the X given first radio signals comprise a total of Y HARQ-ACK feedbacks, the Y HARQ-ACK feedbacks respectively corresponding to the Y sub-signals, and a value of any of the Y HARQ-ACK feedbacks is either ACK or NACK; the Y HARQ-ACK feedbacks are composed by w1 HARQ-ACK feedbacks and w2 HARQ-ACK feedbacks, wherein the w1 HARQ-ACK feedbacks respectively indicate whether the w1 sub-signals are correctly received; and the w2 HARQ-ACK feedbacks are used to determine t2 first statistical values, of which any first statistical value is one of ACK or NACK; and a first ratio is equal to a ratio of a number of NACK(s) comprised in the w1 HARQ-ACK feedbacks and the t2 first statistical values to a sum of the w1 and the t2.

Embodiment 12

Embodiment 12A-12H respectively illustrate a schematic diagram of relations of X given first radio signals, X given second radio signals and Q.

In Embodiment 12, the first node of the present disclosure is a UE, the X given first radio signals respectively comprise X pieces of second information, and the X pieces of second information respectively comprise scheduling information of the X given second radio signals; the X given second radio signals comprise Z sub-signals, and the X pieces of second information indicate whether any of the Z sub-signals comprises new data, Z being a positive integer no smaller than the X; among sub-signal(s) of the Z sub-signals belonging to a same second radio signal of the X given second radio signals, at least one sub-signal is spatially correlated to the Q energy detection(s); whether the Z sub-signals comprise new data is used to determine the Q. The X given first radio signals correspond to the T1 first-type radio signals of the present disclosure, the X given second radio signals correspond to the T1 second-type radio signals of the present disclosure, and the Z sub-signals correspond to the V sub-signals of the present disclosure; or, the X given first radio signals correspond to the S third-type radio signal(s) and the T1 first-type radio signal(s) of the present disclosure, the X given second radio signals correspond to the S fourth-type radio signal(s) and the T1 second-type radio signal(s) of the present disclosure, and the Z sub-signals correspond to the S2 sub-signal(s) and the V sub-signal(s) of the present disclosure.

In one embodiment, the X pieces of second information are dynamic signalings respectively.

In one embodiment, the X pieces of second information are physical-layer signalings respectively.

In one embodiment, the X pieces of second information are dynamic signalings used for UpLink Grant respectively.

In one embodiment, the X pieces of second information respectively comprise DCI.

In one embodiment, the X pieces of second information respectively comprise UpLink Grant DCI.

In one embodiment, each of the X pieces of second information comprises a first field, and a first field in any of the X pieces of second information indicates whether each sub-signal comprised in a corresponding given second radio signal of the X given second radio signals comprises new data.

In one subembodiment, a first field in any of the X pieces of second information is NDI.

In one subembodiment, a first field in any of the X pieces of second information comprises a positive integer number of bit(s).

In one subembodiment, a first field in any of the X pieces of second information comprises 1 bit.

In one subembodiment, a first field in any of the X pieces of second information comprises 2 bits.

In one embodiment, the Z is greater than the X.

In one embodiment, among sub-signal(s) comprised in one of the X given second radio signals at least one sub-signal is not spatially correlated to the Q energy detection(s).

In one embodiment, among sub-signal(s) comprised in any of the X given second radio signals at least one sub-signal is spatially correlated to the Q energy detection(s).

In one embodiment, among the X given second radio signals there is at least one given second radio signal that comprises multiple sub-signals.

In one embodiment, any of X given second radio signals comprises multiple sub-signals.

In one embodiment, a second reference radio signal comprises Z2 sub-signal(s), and the second reference radio signal is any given second radio signal of the X given second radio signals, each of the Z2 sub-signal(s) belonging to the Z sub-signals.

In one subembodiment, the Z2 is greater than 1, the Z2 sub-signals occupy the same time-domain resources.

In one subembodiment, the Z2 is greater than 1, at least one multicarrier symbol is occupied by each of the Z2 sub-signals.

In one subembodiment, the Z2 is greater than 1, the Z2 sub-signals occupy the same frequency-domain resources.

In one subembodiment, the Z2 is greater than 1, at least one subcarrier is occupied by each of the Z2 sub-signals.

In one subembodiment, the Z2 is greater than 1, respective multi-antenna related transmissions of the Z2 sub-signals are different from each other.

In one subembodiment, the Z2 is greater than 1, respective multi-antenna related transmissions of the Z2 sub-signals are the same.

In one subembodiment, the Z2 is a positive integer no greater than 2.

In one subembodiment, the Z2 is equal to 1.
In one subembodiment, the Z2 is equal to 2.
In one subembodiment, the Z2 is equal to a number of codewords of the second reference radio signal.

In one subembodiment, the second reference radio signal comprises Z2 codeword(s), the Z2 sub-signal(s) respectively corresponding to the Z2 codeword(s).

In one subembodiment, the Z2 is greater than 1, the Z2 sub-signals respectively occupy different antenna ports or different antenna port groups.

In one subembodiment, one of the X pieces of second information corresponding to the second reference radio signal indicates whether each of the Z2 sub-signal(s) comprises new data.

In one embodiment, a first value is equal to a number of sub-signal(s) comprising new data among the Z sub-signals, and the first value is used to determine the Q.

In one embodiment, the Embodiment 12A corresponds to a schematic diagram of relations of X given first radio signals, X given second radio signals and Q, wherein a first value is equal to a number of sub-signal(s) comprising new data among the Z sub-signals.

In one embodiment, a first value is equal to a ratio of a number of sub-signal(s) comprising new data among the Z sub-signals to the Z, and the first value is used to determine the Q.

In one embodiment, the Embodiment 12B corresponds to a schematic diagram of relations of X given first radio signals, X given second radio signals and Q, wherein a first value is equal to a ratio of a number of sub-signal(s) comprising new data among the Z sub-signals to the Z.

In one embodiment, the Z is greater than the X, Z1 sub-signal(s) is(are) sub-signal(s) of the Z sub-signals spatially correlated to the Q energy detection(s), Z1 being a positive integer less than the Z; among the Z sub-signals only information of whether the Z1 sub-signal(s) comprises (comprise) new data is used to determine the Q.

In one embodiment, the Z is greater than the X, Z1 sub-signal(s) is(are) sub-signal(s) of the Z sub-signals spatially correlated to the Q energy detection(s), Z1 being a positive integer less than the Z; a first value is equal to a number of sub-signal(s) comprising new data among the Z sub-signals, and the first value is used to determine the Q.

In one embodiment, the Embodiment 12C corresponds to a schematic diagram of relations of X given first radio signals, X given second radio signals and Q, wherein a first value is equal to a number of sub-signal(s) comprising new data among the Z1 sub-signal(s).

In one embodiment, the Z is greater than the X, and Z1 sub-signal(s) is(are) sub-signal(s) spatially correlated to the Q energy detection(s) among the Z sub-signals, Z1 being a positive integer less than the Z; a first value is equal to a ratio of a number of sub-signal(s) comprising new data among the Z1 sub-signal(s) to the Z1, and the first value is used to determine the Q.

In one embodiment, the Embodiment 12D corresponds to a schematic diagram of relations of X given first radio signals, X given second radio signals and Q, wherein a first value is equal to a ratio of a number of sub-signal(s) comprising new data among the Z1 sub-signal(s) to the Z1.

In one embodiment, the Z is greater than the X, whether the Z sub-signals comprise new data is used to determine X second statistical values, and the X second statistical values respectively indicate whether the X given second radio signals are counted as comprising new data, the X second statistical values being used to determine the Q.

In one subembodiment, a second reference radio signal is any of the X given second radio signals, and at least one of sub-signal(s) belonging to the second reference radio signal among the Z sub-signals is not spatially correlated to the Q energy detection(s).

In one subembodiment, a second reference radio signal is any of the X given second radio signals, and each of sub-signal(s) comprised by the second reference radio signal among the Z sub-signals comprises new data, the second reference radio signal being counted as comprising new data.

In one subembodiment, a second reference radio signal is any of the X given second radio signals, and at least one of sub-signal(s) comprised by the second reference radio signal among the Z sub-signals does not comprise new data, the second reference radio signal being counted as not comprising new data.

In one embodiment, a first value is equal to a number of given second radio signal(s) counted as comprising new data among the X given second radio signals indicated by the X second statistical values, and the first value is used to determine the Q.

In one embodiment, the Embodiment 12E corresponds to a schematic diagram of relations of X given first radio signals, X given second radio signals and Q, wherein any value of the X second statistical values either comprises new data or does not comprise new data, and a first value is equal to a number of second statistical value(s) comprising new data among the X second statistical values.

In one embodiment, a first value is equal to a ratio of a number of given second radio signal(s) counted as comprising new data among the X given second radio signals indicated by the X second statistical values to the X, the first value being used to determine the Q.

In one embodiment, the Embodiment 12F corresponds to a schematic diagram of relations of X given first radio signals, X given second radio signals and Q, wherein any value of the X second statistical values either comprises new data or does not comprise new data, and a first value is equal to a ratio of a number of second statistical value(s) comprising new data among the X second statistical values to the X.

In one embodiment, the Z is greater than the X, the X given second radio signals are composed by t3 given second radio signals and t4 given second radio signals, wherein each sub-signal comprised by any of the t3 given second radio signals is spatially correlated to the Q energy detection(s), and at least one sub-signal comprised by any of the t4 given second radio signals is not spatially correlated to the Q energy detection(s), t3 being a positive integer greater than 1 and less than the X, and t4 being a positive integer greater than 1 and less than X, X being a sum of t3 and t4. The t3 given second radio signals comprise w3 sub-signals, and the t4 given second radio signals comprise w4 sub-signals, the Z sub-signals being composed by the w3 sub-signals and the w4 sub-signals; whether the w4 sub-signals comprise new data is used to determine t4 second statistical values, the t4 second statistical values respectively indicate whether the t4 given second radio signals are counted as comprising new data, and the t4 second statistical values and whether the w3 sub-signals comprise new data are used to determine the Q.

In one subembodiment, a second reference radio signal is any of the t4 given second radio signals, and each of sub-signal(s) comprised by the second reference radio signal among the w4 sub-signals comprises new data, the second reference radio signal being counted as comprising new data.

In one subembodiment, a second reference radio signal is any of the t4 given second radio signals, and at least one of sub-signal(s) comprised by the second reference radio signal among the w4 sub-signals does not comprise new data, the second reference radio signal being counted as not comprising new data.

In one embodiment, a first value is equal to a sum of a number of sub-signal(s) comprising new data among the w3 sub-signals and a number of given second radio signal(s) counted as comprising new data among the t4 given second radio signals indicated by the t4 second statistical values, the first value being used to determine the Q.

In one embodiment, the Embodiment 12G corresponds to a schematic diagram of relations of X given first radio signals, X given second radio signals and Q, wherein any value of the t4 second statistical values either comprises new data or does not comprise new data, and a first value is equal to a sum of a number of sub-signal(s) comprising new data among the w3 sub-signals and a number of second statistical value(s) comprising new data among the t4 second statistical values.

In one embodiment, a third reference value is equal to a sum of a number of sub-signal(s) comprising new data among the w3 sub-signals and a number of given second radio signal(s) counted as comprising new data among the t4 given second radio signals indicated by the t4 second statistical values, while a fourth reference value is equal to a sum of the w3 and the t4, and a first value is equal to a ratio of the third reference value to the fourth reference value, the first value being used to determine the Q.

In one embodiment, the Embodiment 12H corresponds to a schematic diagram of relations of X given first radio signals, X given second radio signals and Q, wherein any value of the t4 second statistical values either comprises new data or does not comprise new data, a third reference value is equal to a sum of a number of sub-signal(s) comprising new data among the w3 sub-signals and a number of second statistical value(s) comprising new data among the t4 second statistical values, while a fourth reference value is a sum of the w3 and the t4, and a first value is equal to a ratio of the third reference value to the fourth reference value.

Embodiment 13

Figure 13:
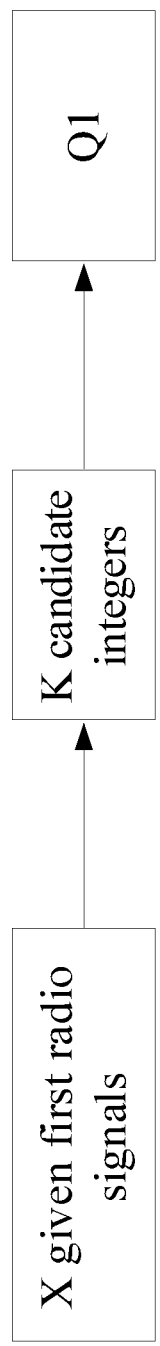
FIG. 13 illustrates a schematic diagram of X given first radio signals being used to determine Q according to one embodiment of the present disclosure.

Embodiment 13 illustrates a schematic diagram of X given first radio signals being used to determine Q, as shown in FIG. 13.

In Embodiment 13, the X given first radio signals are used to determine K candidate integers, Q1 being one of the K candidate integers; each of Q1 detection value(s) among the Q detection value(s) is lower than a first threshold, K being a positive integer, and Q1 being a positive integer no greater than the Q. The X given first radio signals correspond to the T1 first-type radio signals of the present disclosure, or the X given first radio signals correspond to the S third-type radio signal(s) and the T1 first-type radio signal(s) of the present disclosure.

In one embodiment, the first node selects a value of the Q1 from the K candidate integers at random.

In one embodiment, the first node selects any candidate integer from the K candidate integers as a value of the Q1 at equal probability.

In one embodiment, the K candidate integers are 0, 1, 2 . . . , and K−1.

In one embodiment, the K is CWp, the CWp is contention window size, and the detailed definition of the CWp can be found in 3GPP TS36.213, section 15.

In one embodiment, any of the K candidate integers is a non-negative integer.

In one embodiment, the K candidate integers comprise 0.

In one embodiment, any two of the K candidate integers are unequal.

In one embodiment, the K is a positive integer greater than 1.

Embodiment 14

Embodiment 14 illustrates a schematic diagram of X given first radio signals being used to determine K candidate integers, as shown in FIG. 14.

In Embodiment 14, the K is a positive integer in a first integer set, the first integer set comprises a positive integer number of positive integer(s); when a first condition is met, the K is equal to K1, otherwise the K is equal to a minimum positive integer in the first integer set; when K0 is not a maximum positive integer in the first integer set, the K1 is equal to a smallest positive integer greater than the K0 in the first integer set, otherwise the K1 is equal to the K0; the K0 is a positive integer in the first integer set. Q1 is a candidate integer among the K candidate integers; each of the Q1 detection value(s) among the Q detection value(s) of the present disclosure is lower than the first threshold of the present disclosure; the first node of the present disclosure is a base station; the first condition is: a given ratio corresponding to X given first radio signals is not smaller than a first target value; the X given first radio signals correspond to the T1 first-type radio signals of the present disclosure, or, the X given first radio signals correspond to the S third-type radio signal(s) and the T1 first-type radio signal(s) of the present disclosure; the given ratio corresponds to the first ratio of the present disclosure.

In FIG. 14, the first integer set is {15, 31, 63}, of which the K0 is equal to 31, and the K1 is equal to 63. When the given ratio is no less than the first target value, the K is equal to the K1; otherwise the K is equal to 15.

In one embodiment, a priority class corresponding to the fifth radio signal of the present disclosure is used to determine the first integer set.

In one subembodiment, the priority class corresponding to the fifth radio signal is 3.

In one embodiment, the K0 is CWp in a latest Cat 4 LBT process before the Q time sub-pool(s), the CWp is contention window size, and the detailed definition of the CWp can be found in 3GPP TS36.213, section 15.

In one embodiment, the first target value is pre-defined.

In one embodiment, the first target value is a non-negative real number.

In one embodiment, the first target value is equal to 80%.

Embodiment 15

Embodiment 15 illustrates another schematic diagram of X given first radio signals being used to determine K candidate integers, as shown in FIG. 15.

In Embodiment 15, the K is a positive integer in a first integer set, the first integer set comprises a positive integer number of positive integer(s); when a second condition is met, the K is equal to K1, otherwise the K is equal to a minimum positive integer in the first integer set; when K0 is not a maximum positive integer in the first integer set, the K1 is equal to a smallest positive integer greater than the K0 in the first integer set, otherwise the K1 is equal to the K0; the K0 is a positive integer in the first integer set. Q1 is a candidate integer among the K candidate integers; each of the Q1 detection value(s) among the Q detection value(s) of the present disclosure is lower than the first threshold of the present disclosure.

In Embodiment 15, the first node of the present disclosure is a UE; the second condition is: a given value to which the X given first radio signals are used to correspond is no greater than a second target value. The X given first radio signals correspond to the T1 first-type radio signals of the present disclosure, or, the X given first radio signals correspond to the S third-type radio signal(s) and the T1 first-type radio signal(s) of the present disclosure; the given value corresponds to the first value of the present disclosure.

In FIG. 15, the first integer set is {15, 31, 63}, of which the K0 is equal to 63, and the K0 is the maximum positive integer in the first integer set, and the K1 is equal to the K0. When the given value is no greater than the second target value, the K is equal to the K0; otherwise the K is equal to 15.

In one embodiment, the second target value is pre-defined.

In one embodiment, the second target value is a non-negative real number.

In one embodiment, the second target value is a non-negative integer.

In one embodiment, the second target value is equal to 0.

Embodiment 16

Figure 16:
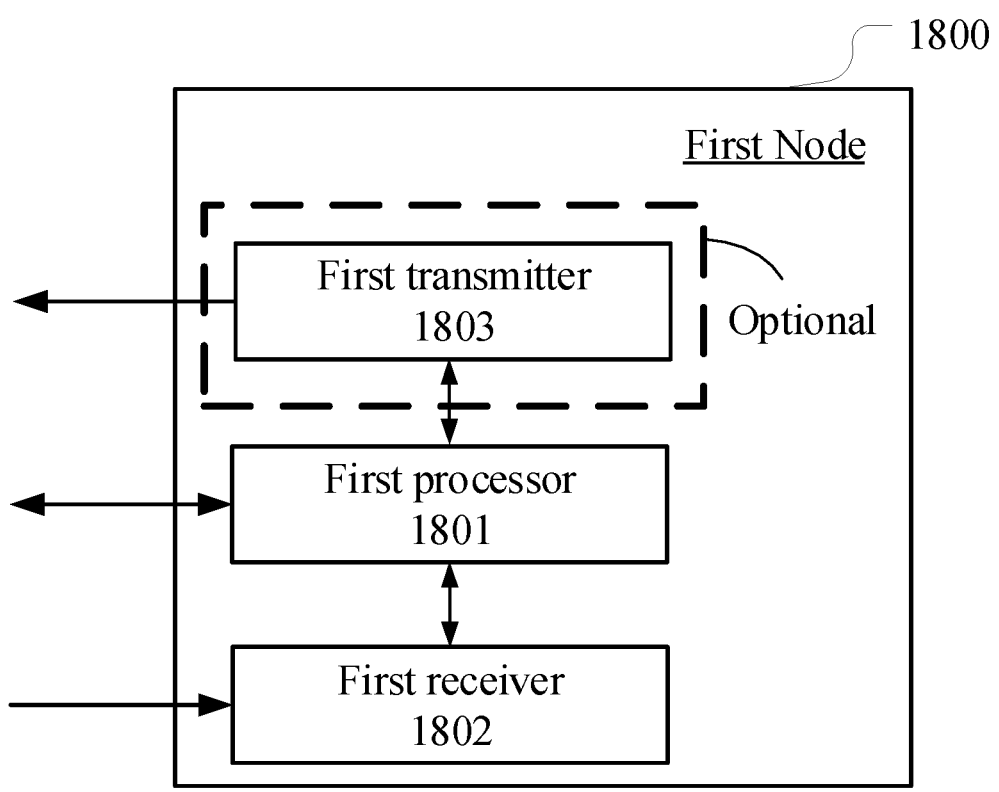
FIG. 16 illustrates a structure block diagram of a processing device in a first node according to one embodiment of the present disclosure.

Embodiment 16 illustrates a structure block diagram of a processing device in a first node; as shown in FIG. 16. In FIG. 16, a processing device 1800 in a first node comprises a first processor 1801, a first receiver 1802 and a first transmitter 1803, wherein the first transmitter 1803 is optional.

The first processor 1801 receives T first-type radio signals, and transmits T second-type radio signals in a first time window.

The first receiver 1802 performs Q energy detection(s) respectively in Q time sub-pool(s) on a first sub-band to obtain Q detection value(s).

In Embodiment 16, the T second-type radio signals respectively correspond to the T first-type radio signals; at least one multicarrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station, or the first node is a UE.

In one embodiment, the first node is a base station, and the T first-type radio signals respectively indicate whether the T second-type radio signals are correctly received.

In one embodiment, the T1 second-type radio signal(s) comprises(comprise) W sub-signal(s), and the T1 first-type radio signal(s) indicates(indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

In one embodiment, the first node is a UE, and the T first-type radio signals respectively comprise scheduling information of the T second-type radio signals.

In one embodiment, the T1 second-type radio signal(s) comprises(comprise) V sub-signal(s), and the T1 first-type radio signal(s) indicates(indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

In one embodiment, the T1 first-type radio signal(s) is(are) used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

In one embodiment, the first processor 1801 also receives S third-type radio signal(s), and transmits S fourth-type radio signal(s) in a second time window; wherein the S fourth-type radio signal(s) respectively corresponds(correspond) to the S third-type radio signal(s); the S third-type radio signal(s) and the T1 first-type radio signal(s) are jointly used to determine the Q, and S is a positive integer; each of the S fourth-type radio signal(s) is spatially associated with the Q energy detection(s).

In one embodiment, the device in the first node comprises:

A first transmitter 1803, transmitting a fifth radio signal;

herein, a start time for time-domain resources occupied by the fifth radio signal is no earlier than an end time for the Q time sub-pool(s).

In one embodiment, the first processor 1801 also operates first information; wherein the first information comprises scheduling information of the fifth radio signal; the operating is receiving, and the first node is a UE; or the operating is transmitting, and the first node is a base station.

In one subembodiment, the first node is a UE, and the first processor 1801 comprises the transmitter/receiver 456, the transmitting processor 455, the receiving processor 452 and the controller/processor 490 in Embodiment 4.

In one subembodiment, the first node is a UE, and the first processor 1801 comprises at least the first three of the transmitter/receiver 456, the transmitting processor 455, the receiving processor 452 and the controller/processor 490 in Embodiment 4.

In one subembodiment, the first node is a UE, and the first receiver 1802 comprises the receiver 456, the receiving processor 452 and the controller/processor 490 in Embodiment 4.

In one subembodiment, the first node is a UE, and the first receiver 1802 comprises at least the first two of the receiver 456, the receiving processor 452 and the controller/processor 490 in Embodiment 4.

In one subembodiment, the first node is a base station, and the first processor 1801 comprises the transmitter/receiver 416, the transmitting processor 415, the receiving processor 412 and the controller/processor 440 in Embodiment 4.

In one subembodiment, the first node is a base station, and the first processor 1801 comprises at least the first three of the transmitter/receiver 416, the transmitting processor 415, the receiving processor 412 and the controller/processor 440 in Embodiment 4.

In one subembodiment, the first node is a base station, and the first receiver 1802 comprises the receiver 416, the receiving processor 412 and the controller/processor 440 in Embodiment 4.

In one subembodiment, the first node is a base station, and the first receiver 1802 comprises at least the first two of the receiver 416, the receiving processor 412 and the controller/processor 440 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE or terminal in the present disclosure includes but is not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system equipment in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communications, comprising:

receiving T first-type radio signals, and transmitting T second-type radio signals in a first time window;

performing Q energy detection(s) respectively in Q time sub-pool(s) on a first sub-band to obtain Q detection value(s);

wherein the T second-type radio signals respectively correspond to the T first-type radio signals; at least one multicarrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; the Q energy detection(s) is(are) used to determine whether the first sub-band is idle; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station, or the first node is a UE.

2. The method according to claim 1, wherein the first node is a base station, and the T first-type radio signals respectively indicate whether the T second-type radio signals are correctly received.

3. The method according to claim 2, wherein the T1 second-type radio signal(s) comprises(comprise) W sub-signal(s), and the T1 first-type radio signal(s) indicates (indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

4. The method according to claim 1, wherein the first node is a UE, and the T first-type radio signals respectively comprise scheduling information of the T second-type radio signals.

5. The method according to claim 4, wherein the T1 second-type radio signal(s) comprises(comprise) V sub-signal(s), and the T1 first-type radio signal(s) indicates (indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

6. The method according to claim 1, wherein the T1 first-type radio signal(s) is(are) used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

7. The method according to claim 1, further comprising:
receiving S third-type radio signal(s), and transmitting S fourth-type radio signal(s) in a second time window;
wherein the S fourth-type radio signal(s) respectively corresponds(correspond) to the S third-type radio signal(s); the S third-type radio signal(s) and the T1 first-type radio signal(s) are jointly used to determine the Q, and S is a positive integer; each of the S fourth-type radio signal(s) is spatially associated with the Q energy detection(s).

8. The method according to claim 1, further comprising: transmitting a fifth radio signal;
wherein a start time for time-domain resources occupied by the fifth radio signal is no earlier than an end time for the Q time sub-pool(s).

9. The method according to claim 8, further comprising: operating first information;
wherein the first information comprises scheduling information of the fifth radio signal; the operating is receiving, and the first node is a UE; or the operating is transmitting, and the first node is a base station.

10. The method according to claim 8, wherein the fifth radio signal is transmitted on the first sub-band, and the fifth radio signal is spatially associated with the Q energy detection(s).

11. A device in a first node for wireless communications, comprising:
a first processor, receiving T first-type radio signals, and transmitting T second-type radio signals in a first time window; and
a first receiver, performing Q energy detection(s) respectively in Q time sub-pool(s) on a first sub-band to obtain Q detection value(s);
wherein the T second-type radio signals respectively correspond to the T first-type radio signals; at least one multicarrier symbol is occupied by each of the T second-type radio signals; among the T first-type radio signals there is(are) only T1 first-type radio signal(s) being used to determine Q, wherein T is a positive integer greater than 1, the Q is a positive integer, and T1 is a positive integer less than the T; the Q energy detection(s) is(are) used to determine whether the first sub-band is idle; T1 second-type radio signal(s) of the T second-type radio signals that corresponds(correspond) to the T1 first-type radio signal(s) is(are) composed of second-type radio signal(s) spatially associated with the Q energy detection(s) among the T second-type radio signals; the first node is a base station, or the first node is a UE.

12. The device in the first node according to claim 11, wherein the first node is a base station, and the T first-type radio signals respectively indicate whether the T second-type radio signals are correctly received.

13. The device in the first node according to claim 12, wherein the T1 second-type radio signal(s) comprises(comprise) W sub-signal(s), and the T1 first-type radio signal(s) indicates(indicate) whether any of the W sub-signal(s) is correctly received, W being a positive integer no less than the T1; at least one of sub-signal(s) belonging to a same second-type radio signal of the T1 second-type radio signal(s) among the W sub-signal(s) is spatially associated with the Q energy detection(s); whether the W sub-signal(s) is(are) correctly received is used to determine the Q.

14. The device in the first node according to claim 11, wherein the first node is a UE, and the T first-type radio signals respectively comprise scheduling information of the T second-type radio signals.

15. The device in the first node according to claim 14, wherein the T1 second-type radio signal(s) comprises(comprise) V sub-signal(s), and the T1 first-type radio signal(s) indicates(indicate) whether any of the V sub-signal(s) comprises new data, V being a positive integer no less than the T1; at least one of sub-signal(s) belonging to a same second-type radio signal of the T1 second-type radio signal(s) among the V sub-signal(s) is spatially associated with the Q energy detection(s); whether the V sub-signal(s) comprises(comprise) new data is used to determine the Q.

16. The device in the first node according to claim 11, wherein the T1 first-type radio signal(s) is(are) used to determine K candidate integers, Q1 is a candidate integer of the K candidate integers; each of Q1 detection value(s) among the Q detection value(s) is lower than a first threshold, K is a positive integer, and Q1 is a positive integer no greater than the Q.

17. The device in the first node according to claim 11, wherein the first processor also receives S third-type radio signal(s), and transmits S fourth-type radio signal(s) in a second time window; wherein the S fourth-type radio signal(s) respectively corresponds(correspond) to the S third-type radio signal(s); the S third-type radio signal(s) and the T1 first-type radio signal(s) are jointly used to determine the Q, and S is a positive integer; each of the S fourth-type radio signal(s) is spatially associated with the Q energy detection(s).

18. The device in the first node according to claim 11, further comprising:
a first transmitter, transmitting a fifth radio signal;
wherein a start time for time-domain resources occupied by the fifth radio signal is no earlier than an end time for the Q time sub-pool(s).

19. The device in the first node according to claim 18, wherein the first processor also operates first information; wherein the first information comprises scheduling information of the fifth radio signal; the operating is receiving, and the first node is a UE; or the operating is transmitting, and the first node is a base station.

20. The device in the first node according to claim 18, wherein the fifth radio signal is transmitted on the first sub-band, and the fifth radio signal is spatially associated with the Q energy detection(s).

* * * * *